(12) United States Patent
Morris

(10) Patent No.: US 8,657,575 B2
(45) Date of Patent: Feb. 25, 2014

(54) OSCILLATING FLUID POWER GENERATOR

(76) Inventor: David C. Morris, New York, NY (US)

(*) Notice: Subject to any disclaimer, the term of this patent is extended or adjusted under 35 U.S.C. 154(b) by 1616 days.

(21) Appl. No.: 11/895,568

(22) Filed: Aug. 23, 2007

(65) Prior Publication Data

US 2007/0297903 A1    Dec. 27, 2007

Related U.S. Application Data

(63) Continuation-in-part of application No. PCT/US2006/006432, filed on Feb. 24, 2006.

(60) Provisional application No. 60/656,787, filed on Feb. 25, 2005, provisional application No. 60/660,880, filed on Mar. 10, 2005, provisional application No. 60/678,717, filed on May 6, 2005, provisional application No. 60/736,489, filed on Nov. 14, 2005.

(51) Int. Cl.
*F03D 5/06* (2006.01)

(52) U.S. Cl.
USPC .......................................................... 416/79

(58) Field of Classification Search
USPC ........ 415/2.1, 3.1, 4.1, 4.2, 4.3, 4.4, 4.5, 905, 415/906, 907, 908; 416/24, 79, 80, 81, 82, 416/83; 290/44, 55
See application file for complete search history.

(56) References Cited

U.S. PATENT DOCUMENTS

| | | | |
|---|---|---|---|
| 252,947 A | 1/1882 | Jones et al. | |
| 1,274,545 A | 8/1918 | Herwehe | |
| 1,633,460 A | 6/1927 | Silvestrin | |
| 3,442,493 A | 5/1969 | Smith | |
| 3,647,315 A | 3/1972 | Rostad et al. | |
| 3,743,848 A | 7/1973 | Strickland | |
| 3,785,213 A | 1/1974 | Berggren | |
| 3,809,006 A * | 5/1974 | Finn | 440/32 |
| 3,867,058 A * | 2/1975 | Hendrickson | 415/125 |
| 3,995,972 A * | 12/1976 | Nassar | 416/68 |
| 4,024,409 A | 5/1977 | Payne | |
| 4,048,947 A * | 9/1977 | Sicard | 440/8 |
| 4,052,134 A * | 10/1977 | Rumsey | 416/119 |
| 4,251,040 A | 2/1981 | Loyd | |
| 4,298,313 A | 11/1981 | Hohenemser | |

(Continued)

FOREIGN PATENT DOCUMENTS

| | | |
|---|---|---|
| DE | 684417 | 11/1939 |
| EP | 490830 | 6/1992 |

(Continued)

*Primary Examiner* — Nathaniel Wiehe
*Assistant Examiner* — Ryan Ellis
(74) *Attorney, Agent, or Firm* — Robert M Hunter

(57) ABSTRACT

A system and method for harvesting the kinetic energy of a fluid flow for power generation with a vertically oriented, aerodynamic wing structure comprising one or more airfoil elements pivotably attached to a mast. When activated by the moving fluid stream, the wing structure oscillates back and forth, generating lift first in one direction then in the opposite direction. This oscillating movement is converted to unidirectional rotational movement in order to provide motive power to an electricity generator. Unlike other oscillating devices, this device is designed to harvest the maximum aerodynamic lift forces available for a given oscillation cycle. Because the system is not subjected to the same intense forces and stresses as turbine systems, it can be constructed less expensively, reducing the cost of electricity generation. The system can be grouped in more compact clusters, be less evident in the landscape, and present reduced risk to avian species.

16 Claims, 32 Drawing Sheets

(56) References Cited

U.S. PATENT DOCUMENTS

| | | |
|---|---|---|
| 4,346,305 A | 8/1982 | White |
| 4,387,318 A | 6/1983 | Kolm et al. |
| 4,486,145 A * | 12/1984 | Eldredge et al. ............. 416/82 |
| 4,496,848 A | 1/1985 | Binder |
| 4,525,122 A | 6/1985 | Krnac |
| 4,536,674 A | 8/1985 | Schmidt |
| 4,582,013 A | 4/1986 | Holland, Jr. |
| 4,684,817 A | 8/1987 | Goldwater |
| 5,009,571 A * | 4/1991 | Smith ............................ 416/79 |
| 5,193,978 A | 3/1993 | Gutierrez |
| 5,324,169 A | 6/1994 | Brown et al. |
| 5,844,323 A | 12/1998 | Hung |
| 6,153,944 A | 11/2000 | Clark |
| 6,273,680 B1 | 8/2001 | Arnold |
| 6,320,273 B1 | 11/2001 | Nemec |
| 6,323,563 B1 * | 11/2001 | Kallenberg, Jr. ............... 290/42 |
| 6,652,232 B2 | 11/2003 | Bolduc |
| 6,700,218 B2 | 3/2004 | Saiz |
| 6,731,018 B1 | 5/2004 | Grinsted et al. |
| 6,734,576 B2 | 5/2004 | Pacheco |
| 6,853,096 B1 | 2/2005 | Yu et al. |
| 6,926,491 B2 | 8/2005 | Migler |
| 2002/0079705 A1 | 6/2002 | Fowler |
| 2003/0123983 A1 | 7/2003 | Bolduc |
| 2005/0141994 A1 | 6/2005 | Joo |

FOREIGN PATENT DOCUMENTS

| | | |
|---|---|---|
| EP | 683316 | 11/1995 |
| FR | 2620172 | 3/1989 |
| GB | 2073327 | 10/1981 |

\* cited by examiner

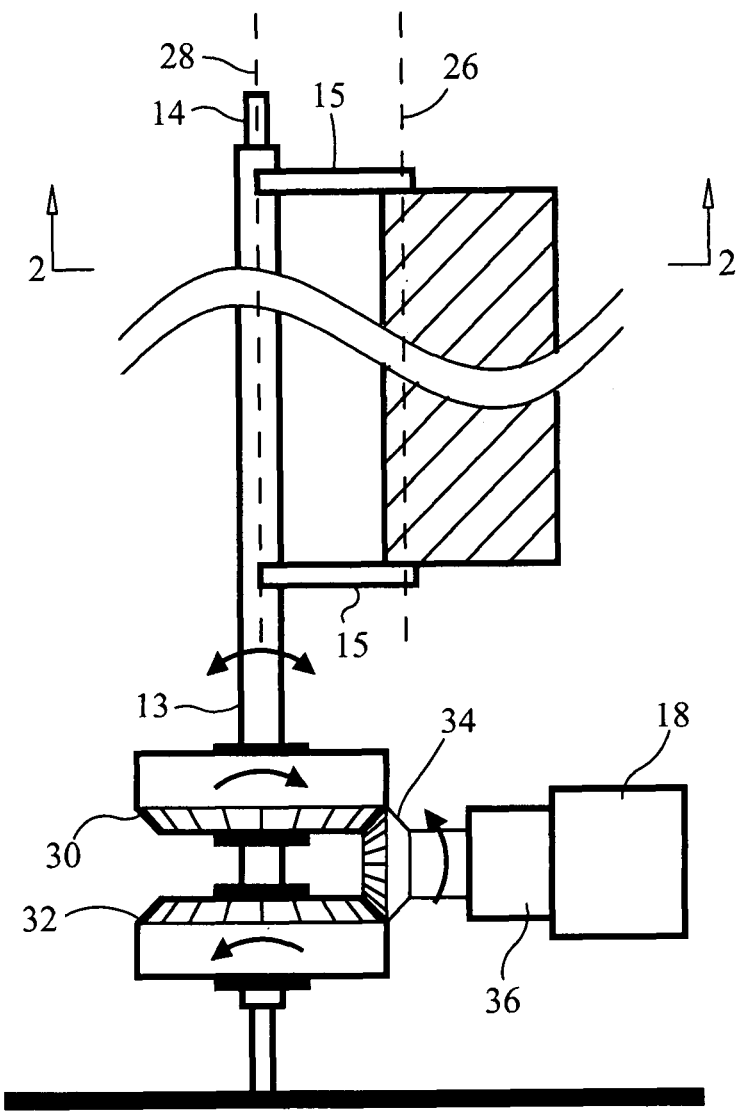
FIG. 1
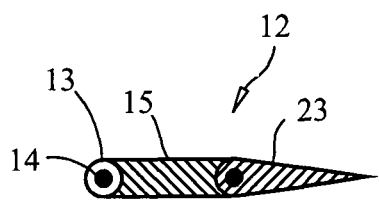 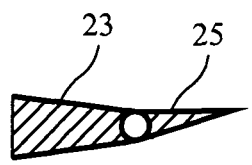 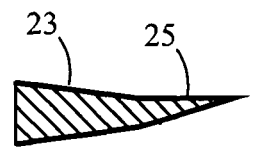
FIG. 2A  FIG. 2B  FIG. 2C

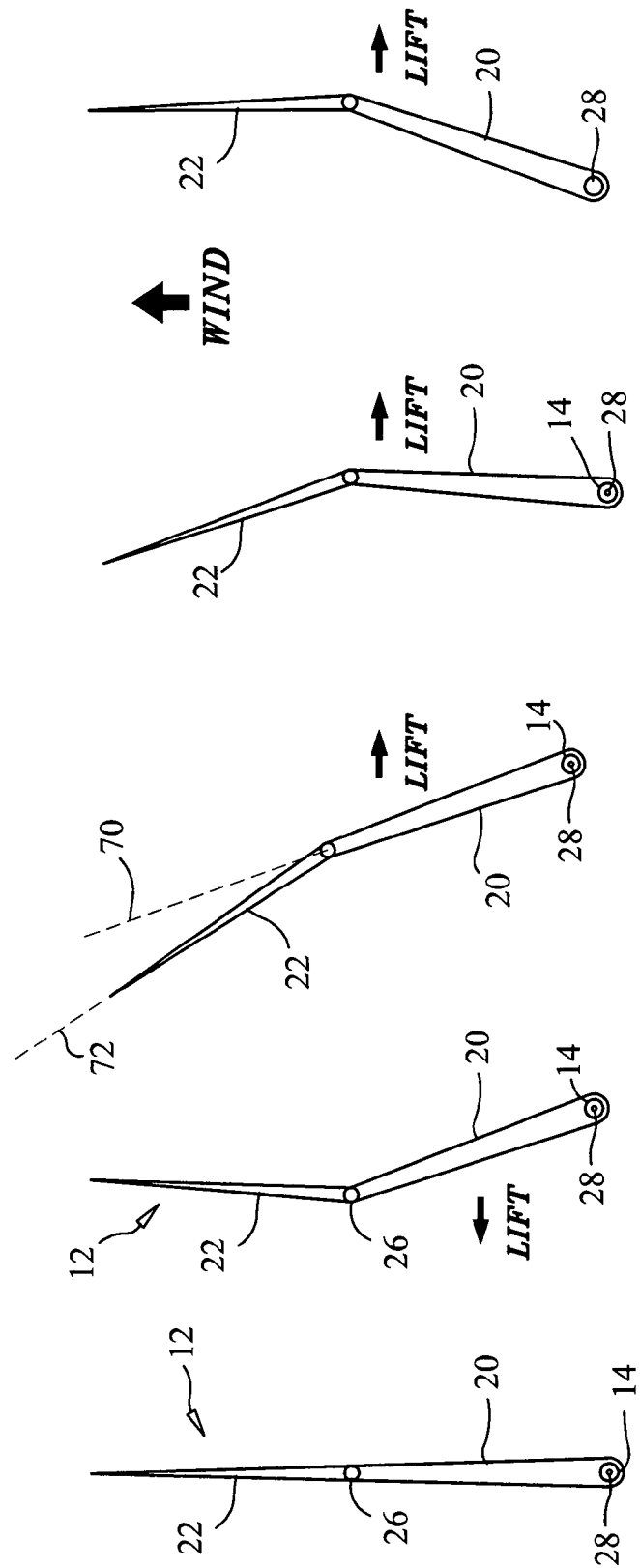

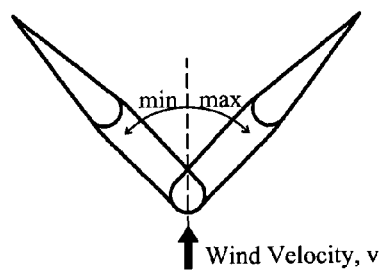
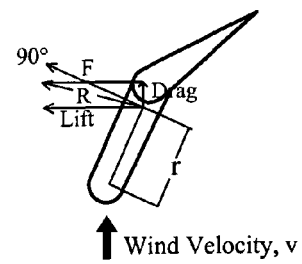
FIG. 46A
FIG. 46B
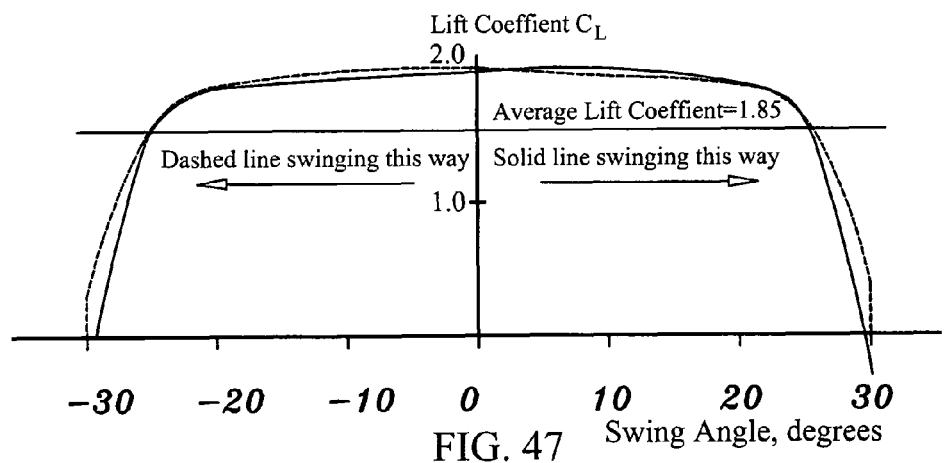
FIG. 47

OSCILLATING FLUID POWER GENERATOR

CROSS-REFERENCE TO RELATED APPLICATIONS

This application is a continuation-in-part of International Patent Application No. PCT/US2006/006432, filed on Feb. 24, 2006, which claimed priority in U.S. Provisional Patent Application No. 60/656,787, filed Feb. 25, 2005; U.S. Provisional Patent Application No. 60/660,880, filed Mar. 10, 2005; U.S. Provisional Patent Application No. 60/678,717, filed May 6, 2005; and U.S. Provisional Patent Application No. 60/736,489, filed Nov. 14, 2005; the disclosures of which patent applications are incorporated by reference as is fully set forth herein.

INCORPORATION-BY-REFERENCE OF MATERIAL SUBMITTED ON A COMPACT DISC

Not Applicable

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DE-FG36-06GO16044 awarded by the U.S. Department of Energy.

BACKGROUND OF THE INVENTION

This invention relates to a method and system for fluid power generation. In particular, the invention relates to a method and system for fluid power generation by means of an oscillating fluid power generator.

In an age of fossil fuel depletion and high energy prices, wind power is a preferred choice for those wishing to power society in a sustainable manner and in a manner which does not cause harm to our environment. Unfortunately, wind power itself is not free from controversy as some react with alarm to the prospect of unsightly large windmills dotting the landscape. Furthermore, turbines can injure or kill birds and bats and interfere with radio frequency (RF) transmissions.

The background art is characterized by U.S. Pat. Nos. 252,947; 1,274,545; 1,633,460; 3,442,493; 3,647,315; 3,743,848; 3,785,213; 3,995,972; 4,024,409; 4,251,040; 4,298,313; 4,346,305; 4,387,318; 4,486,145; 4,496,848; 4,525,122; 4,536,674; 4,582,013; 4,684,817; 5,009,571; 5,193,978; 5,324,169; 5,844,323; 6,153,944; 6,273,680; 6,320,273; 6,652,232; 6,700,218; 6,731,018; 6,734,576; 6,853,096; and 6,926,491; and U.S. patent application Ser. Nos. 2002/0079705, 2003/0123983; and 2005/0141994; the disclosures of which documents are incorporated by reference as if fully set forth herein. The background art is also characterized by the disclosures of the following patent documents: GB 2073327; EP 683316 and EP 490830.

State-of-the-art wind turbines (as well as older wind turbines) have a number of major technical drawbacks that make them expensive to manufacture as well as maintain: (1) they require designs that must overcome great forces at the blade root, including bending in two axes and large torsional loads; they must also resist very large centrifugal forces as well as loading fluctuations caused by wind shadowing from the tower or local ground effect; (2) the towers that support wind turbines must resist high overturning moments at their base due to the very high forces concentrated at the center of the rotor; because of the large rotor blade size in larger systems, towers cannot be guyed; this requires the towers to be constructed of very strong and expensive materials, contributing substantially to the overall system cost; (3) the high-rotation tip speeds of smaller and older large-scale turbines presents a lethal threat to birds and bats; much of the public objection to wind turbines is based on the perception that they contribute to a high death rate for these animals; in addition, many wind turbines are perceived to be noisy; (4) high-lift-capable service equipment is often required for maintenance of the motor/generators that are necessarily located at the top of the wind-turbine towers in horizontal-axis wind turbine systems; (5) in order to withstand very high winds, turbine blades in modern conventional horizontal-axis wind turbine systems must be allowed to feather by rotating the blades approximately 90 degrees along their longitudinal axes, which requires complex and expensive gearing; in Darrieus-type vertical-axis wind turbine systems, the blades cannot be feathered and powerful mechanical brakes or other speed control devices must be employed, increasing the expense of manufacture; (6) Darrieus-type systems are not self-starting and require motors to get the blades rotating at a functional speed; and (7) turbines must be fairly widely spaced to minimize side-by-side and tandem interference with neighboring installations. In conclusion, relatively expensive materials and sophisticated, costly manufacturing techniques are required for wind turbine components, including blades, gearboxes, bearings, and towers. In addition, many systems, especially older, utility-scale systems, require costly maintenance.

BRIEF SUMMARY OF THE INVENTION

Preferred embodiments of this invention have the potential to harvest fluid (wind or moving water) energy much more cost-effectively than turbines, lower the purchase cost of fluid-energy systems, and increase the technical and economic viability of fluid-power generation. In addition, some wind-power embodiments have the potential to eliminate lethality to birds and bats caused by wind-power systems, overcome public objections to the aesthetics of wind-power structures, and improve public acceptance of wind-power generation. In short, preferred embodiments of this invention have outstanding potential to significantly expand wind power's contribution to the global energy supply.

Preferred embodiments of the invention exploit the kinetic energy of an aerodynamic, oscillating apparatus, rather than relying on a rotating turbine. The invention was initially developed as a visually pleasing alternative to wind turbines. In preferred embodiments, the system allows for designs that are more compatible with existing architectural forms as well as able to blend more readily into the natural landscape. Initial testing indicates that this new technology also is much more affordable and cost-effective than wind turbines.

Preliminary wind-tunnel tests and computer modeling of preferred embodiments of this invention, referred to as the "wind fin," have shown that it is similar if not superior in performance to current state-of-the-art wind turbines of comparable size, at approximately half the system cost. This research suggests that the wind fin technology will be technically and economically feasible for use at many different scales, from small-scale distributed wind systems up to large, utility-scale systems. Initial research also suggests that preferred embodiments of the invention can operate more cost-effectively in lower-speed wind areas than wind turbines.

This would facilitate the expansion of wind generation to more prevalent lower-wind sites than are currently being harnessed.

In preferred embodiments, the wind fin invention comprises a method of harvesting energy from a moving fluid stream (wind or water), said method comprising: producing an aerodynamic wing structure with one or more elements having a cross-sectional shape that is operative to cause the aerodynamic lift of said wing structure; fixing said wing structure to a mast in a vertical orientation to produce a wind fin structure; exposing said wind fin structure to a moving fluid stream to produce oscillation, thereby causing said mast to pivot back and forth at an oscillating frequency; converting the back and forth movement into unidirectional rotation to produce motive power; and providing said motive power to an electricity generator.

In preferred embodiments, the wind fin invention is an apparatus for extracting power from a moving fluid stream having a direction of movement, said apparatus comprising three major components: (1) a mast, which in some embodiments anchors the structure, is immobile, and serves as a pivot axis for the wing structure, and in other embodiments serves as a rotatable drive shaft and is supported by a lower support tower; the mast can be guyed for stability or can be free standing; (2) a wing structure that is substantially vertical (plus or minus 5 degrees) in orientation and either is attached to a rotatable sleeve surrounding the mast, which allows the wing structure to swing freely about the mast, or is attached directly to the mast so that the mast rotates back and forth when the wing structure oscillates in the moving fluid stream; the wing structure is composed either of a single symmetrical airfoil or of two or more elements that are attached to each other by hinges; it automatically orients downwind or downstream and responds readily to the moving fluid stream with an oscillating motion; the wing structure's oscillating action is self-sustaining in the moving fluid stream, needs no mechanical assist and is self-starting; wing structures can be constructed in several different ways; for example, they can be constructed like an aircraft wing with a skin that conforms to symmetrical wing ribs or a molded foam core; this skin can be made of fiber reinforced plastic (such as glass fiber reinforced plastic or carbon fiber reinforced plastic), an aircraft fabric covering product (such as Ceconite®), aluminum, or ripstop nylon; in addition, wing structures can be constructed of a rigid material within a frame or be designed to be a self-inflating airfoil, like a parafoil, comprising rows of cells that are open at the front and joined together side by side such that a moving fluid stream keeps the cells inflated; because these wing structures are not subject to the enormous, alternating, bending stresses of wind turbine blades, they can be less complex and much less costly to manufacture; wing structures also can easily be designed in many different color schemes and patterns, making them more visually appealing than wind turbines and able to fit less obtrusively into both built and natural environments; and (3) a power-extraction system that converts the oscillating, bidirectional rotation of the mast or the sleeve surrounding the mast to unidirectional rotation in order to drive an electricity generator, said power-extraction system preferably located at ground level.

The operation of preferred embodiments of the wind fin system is conceptually straightforward. When in a moving fluid stream, the wing structure oscillates, and this oscillating motion generates electricity. The greater the speed of the moving fluid stream, the faster the wing structure oscillates, and the greater the electrical output. The applicant believes that the principle behind the wind fin's oscillating motion is as follows (but his claims are not bound by this principle): Once activated by a moving fluid stream, the wing structure produces aerodynamic lift. This lift force causes the wing structure to swing to the side. At a certain point, the angle of attack of the wing structure inverts due both to the momentum of the outer, trailing edge of the fin (in the case of a single symmetrical airfoil) or the outer trailing element of the wing structure (in the case of a hinged wing structure with two or more elements) and the force of the oncoming fluid stream, producing aerodynamic lift in the opposite direction. The system is now positioned to reverse course: it reverses its swing, and repeats and perpetuates the oscillation.

In a preferred embodiment, the single symmetrical airfoil or fin has a forward section with a symmetrical aeronautical airfoil shape, such as one of the moderately thick NACA four-digit airfoil shapes for aircraft wings developed by the National Advisory Committee for Aeronautics, e.g., NACA airfoils 0012-0018, where the first two numbers indicate that there is no camber (i.e., no asymmetry between the top and bottom curves of the airfoil) and the latter two numbers identify the maximum thickness of the airfoil as a percent of the chord, which can be defined as the imaginary straight line running through the airfoil from its leading edge to its trailing edge (i.e., NACA airfoil 0012 is 12 percent as thick as it is long); this forward section is followed by an elongated, thin, substantially straight (defined as deviating no more than 5 degrees from straight when in a resting state) trailing section that is an integral extension of said symmetrical aeronautical airfoil shape, said elongated, thin, substantially straight trailing section preferably having a length that is between 25 percent and 150 percent of the length of said symmetrical aeronautical airfoil, the two sections forming a concavity where they merge together in the middle section. Preferably, the maximum thickness of said symmetrical aeronautical airfoil shape is from 10 to 30 percent of the chord length of said symmetrical aeronautical airfoil shape. Preferably, the hinge axis or spar of said single symmetrical airfoil or fin is located between 5 percent and 45 percent of the overall chord length of said fin as measured from the leading edge of said fin. Preferably, the maximum thickness of said fin occurs between 10 percent and 35 percent of said overall chord length of said fin as measured from said leading edge of said fin.

In a preferred embodiment, the power take-off mechanism comprises a pair of overrunning clutches that are attached to the rotatable mast or the rotatable sleeve surrounding the mast, a bevel gear that is connected to said pair of overrunning clutches, a gearbox that is connected to said bevel gear, and an electricity generator that is connected to said gear box; such that when said wing structure oscillates back and forth in the moving fluid stream, it causes said rotatable mast or said rotatable sleeve surrounding the mast to pivot back and forth, which turns said overrunning clutches, which drives said bevel gear in a single direction, imparting unidirectional motive power to said gearbox and said generator. This approach might be coupled with a flywheel to maintain angular momentum in a single direction. Other preferred methods of converting the bidirectional rotation of said rotatable mast or said rotatable sleeve surrounding the mast to unidirectional rotation in order to drive an electricity generator include: connecting a crank arm to the forward portion of said wing structure, wherein the oscillating movement of said wing structure is converted into longitudinal back and forth movement of said crank arm, driving an electricity generator; rectifying the oscillations electronically such that continuous power is generated; and charging and discharging large capacitors to produce an essentially constant output.

One object of preferred embodiments of the invention is to avoid the tremendous stresses that wind turbine blades need to withstand. Therefore, the wind fins in accordance with these embodiments of the invention can be constructed of lower-cost, less complex, lighter-weight (but highly durable) materials, making power generation with this new technology significantly more affordable and cost-effective. Another object of preferred embodiments of the invention is to function effectively at lower wind speeds. The large wind surface of the wind fins in accordance with this embodiment of the invention, compared to the much smaller wind surface areas of wind turbine blades, creates greater responsiveness to wind force, allowing the new system to function effectively at lower wind speeds than existing wind turbines. Yet another objective of preferred embodiments of the invention is to reduce maintenance requirements. Maintenance is greatly simplified and less costly, because the wind fin is a much simpler system than both (1) conventional horizontal-axis wind turbines, where the fan-like rotor is located at the top of a tower, and (2) vertical-axis wind turbines, where the rotor blades revolve around a vertically aligned axle. In addition, the wind fin's power-extraction system is located at ground level, where it is readily accessible for maintenance. By contrast, the power-extraction system (including generator and gearbox) in horizontal-axis wind turbine designs is located high above the ground, increasing the logistical difficulties and expense of maintenance; in vertical-axis wind turbine systems, it is often located inside the rotating vertical tube, where it is relatively inaccessible for maintenance. A further object of preferred embodiments of the invention is to decrease lethality to birds and bats. The downwind orientation of the oscillating wind fins, combined with their relatively short range of movement and lower speeds than wind turbine blades, prevents this new technology from being lethal to birds and bats. In addition, some embodiments of the oscillating wind fins are expected be far less noisy than wind turbines. Both of these factors should help overcome specific public objections to current wind-turbine technology. Another object of preferred embodiments of the invention is to be more aesthetically pleasing than wind turbines. Its upright, vertical, finned form is more compatible with existing architectural structures than are wind turbines. In addition, wind fins can easily be designed in different color schemes and patterns. Therefore, this new system can blend more readily into both built and natural landscapes. The visual advantages of this new technology will allow it to overcome public objections to wind power on aesthetic grounds.

In a preferred embodiment, the invention is an apparatus for extracting power from a moving fluid stream, said apparatus comprising: an immobile mast; a sleeve that pivots about said mast; a wing structure selected from the group consisting of: (1) a single fin comprising at least two stand-off arms, each of which stand-off arms having two ends, a first end that is fixed to said sleeve and a second end pivotably attached to the hinge axis or spar of the forward edge of a symmetrical airfoil, and (2) a multiple-element structure comprising a first airfoil element having two ends, a first end that is fixed to said sleeve and a second end upon which a pivot is mounted, and a second airfoil element having a forward edge that is attached to each said pivot, wherein said airfoils, either singly or as a combination, present airfoil surfaces to the moving fluid stream that generate lift first in one direction that is transverse the direction of movement of the moving stream and then in another direction that is opposite said one direction during an oscillation of said airfoils in the moving fluid stream; and a power take-off mechanism that converts the pivoting motion of the sleeve surrounding the mast to unidirectional rotation in order to drive an electricity generator. Preferably, the apparatus further comprises a trim bias element that is attached to said symmetrical airfoil in order to facilitate the oscillation.

Preferably, the apparatus further comprises a weight located at, near or beyond (on one or more cantilevered poles extending out as much as 3 times the chord length) the trailing edge of said single symmetrical airfoil or said second airfoil element that is operative to facilitate the oscillation of said wing structure. Preferably, this weight can be moved towards the center of mass of said wing structure as a way to control the oscillation of said second airfoil element. Preferably, said airfoil elements are selected from the group consisting of: a ribbed airfoil, with a lightweight skin that conforms to symmetrical wing ribs, a molded foam airfoil covered with a lightweight skin, a framed sheet airfoil; and a self-inflating airfoil.

In another preferred embodiment, the invention is an apparatus for extracting power from a moving fluid stream, said apparatus comprising: a mast that functions as a drive shaft, which is supported by a lower tower structure; a wing structure connected directly to the mast or drive shaft selected from the group consisting of: (1) a single fin comprising at least two stand-off arms, each of which stand-off arms having two ends, a first end that is fixed to said mast and a second end pivotably attached to the hinge axis or spar of the forward edge of a symmetrical airfoil, and (2) a multiple-element structure comprising a first airfoil element having two ends, a first end that is fixed to said mast and a second end upon which a pivot is mounted, and a second airfoil element having a forward edge that is attached each said pivot, wherein said airfoils, either singly or as a combination, present airfoil surfaces to the moving fluid stream that generate lift first in one direction that is transverse the direction of movement of the moving stream and then in another direction that is opposite said one direction during an oscillation of said airfoils in the moving fluid stream; and a power take-off mechanism that converts the oscillating, bidirectional rotation of the mast to unidirectional rotation in order to drive an electricity generator. Preferably, the apparatus further comprises a trim bias element that is attached to said symmetrical airfoil in order to facilitate the oscillation. Preferably, the apparatus further comprises a weight located at, near or beyond (on one or more cantilevered poles extending out as much as 3 times the chord length) the trailing edge of said single symmetrical airfoil or said second airfoil element that is operative to facilitate the oscillation of said wing structure. Preferably, this weight can be moved towards the center of mass of said wing structure as a way to control the oscillation of said second airfoil element. Preferably, said airfoil elements are selected from the group consisting of: a ribbed airfoil, with a lightweight skin that conforms to symmetrical wing ribs, a molded foam airfoil covered with a lightweight skin, a framed sheet airfoil; and a self-inflating airfoil.

In a preferred embodiment, the first airfoil element in a multiple-element wing structure comprises a symmetrical airfoil and the second airfoil element further comprises a symmetrical airfoil that is pivotably attached to said first airfoil element.

In another preferred embodiment, the wing structure's airfoil elements comprise a plurality of stacked elements.

In another preferred embodiment, the wing structure is tapered along its vertical extent at either end or at both ends.

In another preferred embodiment, the invention is an apparatus for extracting power from a moving fluid stream, said apparatus comprising: a mast assembly; a wing structure comprising a leading airfoil element (e.g., leading form) having a leading edge that is connected to said mast assembly, either directly or to a rotatable sleeve surrounding the mast, and a following edge; a plurality of following airfoil elements (e.g., following forms), each of which has a front edge and a rear edge, the front edge of a first of said following airfoil elements being pivotably attached to the following edge of said leading airfoil element, and the front edge of each other following airfoil element being pivotably attached to the rear end of another following airfoil element; and a power take-off mechanism that is driven either directly by a pivoting movement of said mast and said first airfoil element or by a pivoting movement of said rotatable sleeve and first airfoil element with said mast remaining stationary; wherein said airfoil elements are configured to, in combination, present airfoil surfaces to the moving fluid stream that generate lift first in one direction that is transverse the direction of movement of the moving stream and then in another direction that is opposite said one direction during an oscillation of said airfoil elements in the moving fluid stream. Preferably, the apparatus further comprises: a gear arrangement or a linkwork arrangement that links said leading airfoil element and a third following airfoil element. Preferably, the apparatus further comprises: a gear arrangement or a linkwork arrangement that links said second following airfoil element and a fourth following airfoil element. Preferably, the apparatus further comprises: a first link arm having that is fixed to said leading airfoil element, said first link arm having a first end; a second link arm that is fixed to said third following airfoil element, said second link arm having a second end; and a lever arm that links said first end to said second end. Preferably, said airfoil elements are selected from the group consisting of: a ribbed airfoil, with a lightweight skin that conforms to symmetrical wing ribs, a molded foam airfoil covered with a lightweight skin, a framed sheet airfoil; and a self-inflating airfoil. Preferably, the apparatus further comprises: a power-extraction system that converts the oscillating, bidirectional rotation of the mast or the sleeve surrounding the mast to unidirectional rotation in order to drive an electricity generator.

In a further preferred embodiment, the invention is an apparatus for extracting power from a moving fluid stream, said apparatus comprising: a mast; a wing structure comprising a combination having one or more vertically oriented airfoil elements that are connected to said mast; and a power take-off mechanism that is driven either directly by a pivoting movement of said mast and said single symmetrical airfoil or by a pivoting movement of said single symmetrical airfoil with said mast remaining stationary; wherein said wing structure is configured to present airfoil surfaces to the moving fluid stream that generate lift first in one direction that is transverse the direction of movement of the moving stream and then in another direction that is opposite said one direction during an oscillation of said wing structure in the moving fluid stream; thereby maximizing the aerodynamic lift of said wing structure in the moving stream, which in turn maximizes the conversion of the energy of the moving stream into useful power.

In a further preferred embodiment, the invention is an apparatus for extracting power from a moving fluid stream that is moving above a ground level, said apparatus comprising: a stationary support tower; a rotatable drive shaft operable for bidirectional rotation that is supported by said stationary support tower; a wing structure comprising at least two stand-off arms or torque arms, each of which stand-off arm or torque arm having two ends, a first end that is fixed to said drive shaft and a second end that is pivotably attached to a hinge axis or spar, and a single symmetrical airfoil that is attached to each said hinge axis or spar, said single symmetrical airfoil having a leading edge, symmetrically curved sides and a chord length; and a power take-off mechanism that is operative to convert bidirectional rotation to unidirectional rotation; wherein said wing structure is configured to oscillate back and forth in the moving fluid stream which is operative to cause said rotatable drive shaft to pivot back and forth; and wherein said pivoting movement of said rotatable drive shaft is converted by said power take-off mechanism to unidirectional rotational movement in order to provide motive power to an electricity generator. Preferably, said hinge axis or spar is located between 5 percent and 45 percent of the chord length of said single symmetrical airfoil as measured from said leading edge of said single symmetrical airfoil. Preferably, said wing structure further comprises a single symmetrical airfoil having a maximum thickness and a chord length and comprising a forward section that has a symmetrical aeronautical airfoil shape that is preferably from 10 to 30 percent as wide as it is long, said forward section being followed by an elongated, thin, substantially straight trailing section that is an integral extension of said symmetrical aeronautical airfoil shape, said elongated, thin, substantially straight trailing section preferably having a length that is from 25 to 150 percent of the chord length of said symmetrical aeronautical airfoil shape, the two sections forming a concavity where they merge together. Preferably, the maximum thickness of said single symmetrical airfoil occurs between 10 percent and 35 percent of the chord length of said single symmetrical airfoil as measured from said leading edge of said single symmetrical airfoil. Preferably, single symmetrical airfoil or said airfoil elements are selected from the group consisting of: a ribbed airfoil comprising symmetrical wind ribs and a skin made of fiber-reinforced plastic, an aircraft fabric covering, aluminum, or ripstop nylon that conforms to said symmetrical wing ribs; a foam core airfoil comprising a molded foam core and a skin made of fiber-reinforced plastic, an aircraft fabric covering, aluminum, or ripstop nylon that conforms to said molded foam core; a framed sheet airfoil; a self-inflating airfoil having a front and comprising rows of cells that are open at the front and joined together side by side such that the moving fluid stream keeps the cells inflated. Preferably, said power take-off mechanism is located at the ground level and is selected from the group consisting of: a pair of overrunning clutches, a bevel gear that is connected to said pair of overrunning clutches, a gearbox that is connected to said bevel gear and an electricity generator that is connected to said gear box, wherein said overrunning clutches and said bevel gear, as a combination, are operative to convert the bidirectional rotation of the said rotatable drive shaft or said rotatable sleeve into unidirectional rotation in order to provide motive power to said gearbox and said electricity generator; and a crank arm that is connected to at least one of the stand-off arms of said wing structure, wherein the oscillating movement of said wing structure is converted into longitudinal back and forth movement of said crank arm, which drives an electricity generator.

In another preferred embodiment, the invention is a method of generating power comprising: placing an apparatus disclosed herein in a location that experiences a sustained wind; initiating the oscillating of said wing structure thereby causing said rotatable drive shaft or mast or said rotatable sleeve surrounding said mast to rotate back and forth; and converting the back and forth movement to unidirectional rotation in order to produce motive power and provide said motive power to an electricity generator.

In another preferred embodiment, the invention is a method of generating power comprising: the step of placing an apparatus disclosed herein in a location that experiences a wind; the step of allowing the combination of said stand-off arms and said symmetrical airfoil to oscillate in said wind, causing said mast or said sleeve surrounding said mast to rotate back and forth; the step of converting the back and forth movement into unidirectional rotation using a power take-off mechanism that is operative to convert bidirectional rotation to unidirectional rotation; and the step of providing motive power to an electricity generator by means of said power take-off system.

In yet another preferred embodiment, the invention is a method of generating power comprising: a step for placing apparatus disclosed herein in a location that experiences a sustained wind; a step for initiating the oscillating of said wing structure thereby causing said rotatable drive shaft or said rotatable sleeve to move back and forth; a step for converting the back and forth movement into unidirectional rotation to produce motive power; and a step for providing said motive power to a electricity generator.

In yet another preferred embodiment, the invention is a method of harvesting energy from the wind, said method comprising: a step for producing an aerodynamic wing structure with one or more elements having a cross-sectional shape that is operative to cause the aerodynamic lift of said wing structure; a step for fixing said wing structure to a mast in a vertical orientation to produce a wind fin structure; a step for exposing said wind fin structure to the wind to produce oscillation, thereby causing said mast to pivot back and forth at an oscillating frequency; a step for converting the back and forth movement into unidirectional rotation to produce motive power; and a step for providing said motive power to an electricity generator.

In yet another preferred embodiment, the invention is a system for extracting power from a moving fluid stream, said system comprising: means for providing support; means for performing bidirectional rotation that is supported by said means for support; means for oscillating in the moving fluid stream, said means for oscillating comprising means for applying torque to said means for performing bidirectional rotation and means for generating lift that is pivotably attached to said means for applying torque at a pivot, said means for generating lift comprising an airfoil having a leading edge and a transverse cross section having symmetrically curved sides about a longitudinal plane that bisects said transverse cross section; and means for converting bidirectional rotation of said means for performing bidirectional rotation into unidirectional rotation.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 1 is an elevation view of a preferred embodiment of the invention.

FIG. 2A is a cross sectional view of the wing structure of the preferred embodiment of the invention of FIGS. 1 and 50.

FIG. 2B is a cross sectional view of the trailing edge of a preferred embodiment of the wing structure of the invention, the trailing edge comprising a spring-loaded trim bias member.

FIG. 2C is a cross sectional view of the trailing edge of a preferred embodiment of the wing structure of the invention, the trailing edge comprising a permanent trim bias member.

FIG. 24A illustrates a two element frame sheet embodiment, FIG. 24B illustrates a two element ribbed airfoil, FIG. 24C illustrates a two element ribbed, tapered embodiment, FIG. 24D illustrates a three element ribbed airfoil, FIG. 24E illustrates a two element stacked embodiment, FIG. 24F illustrates a framed sheet, single element standoff embodiment, FIG. 24G illustrates a ribbed airfoil, single element, stand-off embodiment, FIG. 24H illustrates a 3DL process sail, single element stand-off embodiment.

FIGS. 26-30 are plan views illustrating a complete oscillation of a preferred embodiment of the invention.

FIGS. 46A and 46B are plan views illustrating the range of motion of and forces imposed on a preferred embodiment of the invention.

FIG. 47 is a graph of the lift coefficient of the embodiment of FIGS. 46A and 46B.

Figure 3:
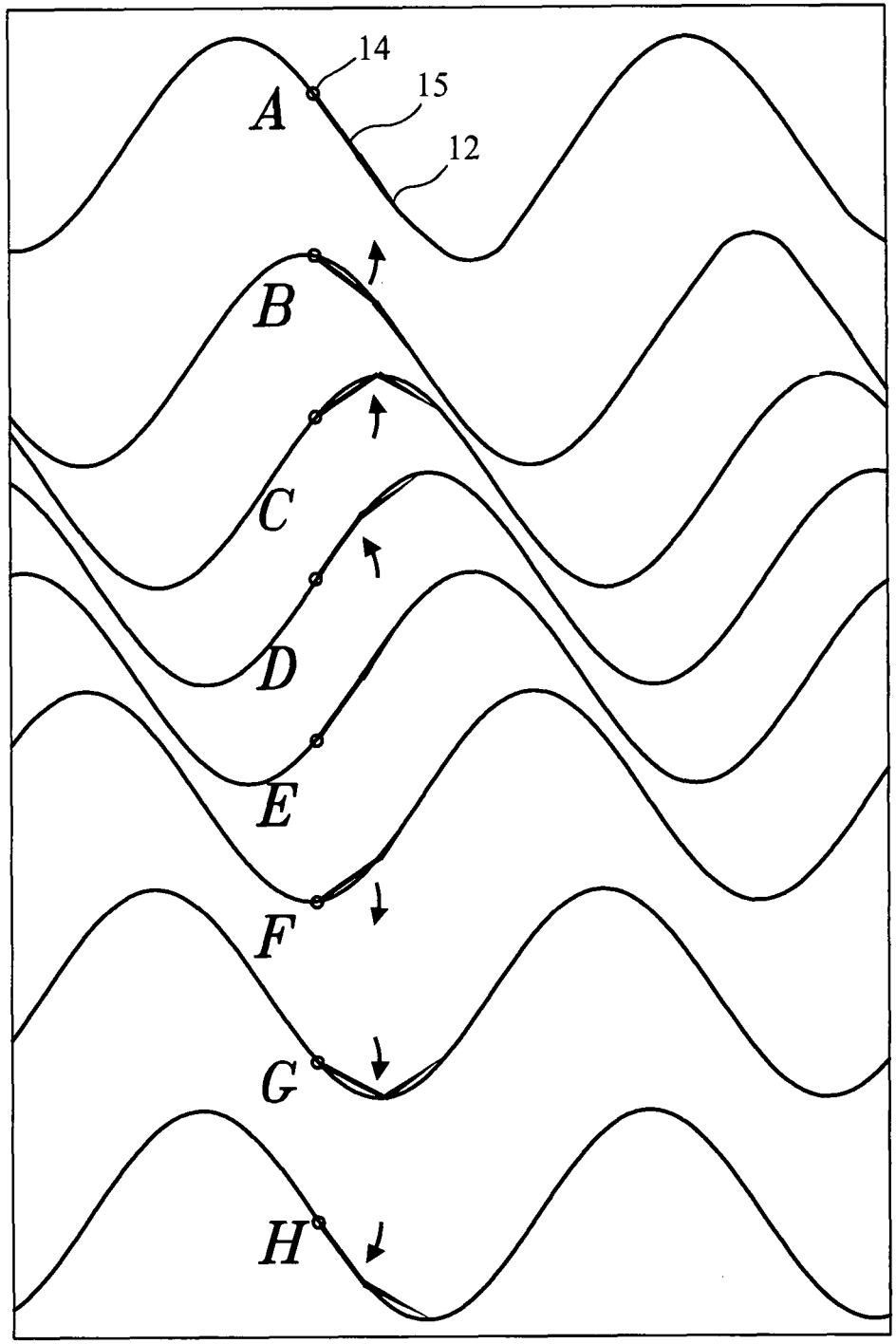
FIG. 3 is a time lapse view of eight steps in the oscillation of the wing structure of a preferred embodiment of the invention of FIG. 1.

The following reference numerals are used to indicate the parts and environment of the invention on the drawings:

| | |
|---|---|
| 1 | first stage |
| 2 | second stage |
| 3 | third stage |
| 4 | fourth stage |
| 10 | system, wind power generator system |
| 11 | frame, spar and guy wire set |
| 12 | wing structure, articulated wing structure, mechanism, wind fin, hinged wing structure |
| 13 | sleeve |
| 14 | mast, oscillating drive shaft |
| 15 | stand-off arm, torque arm, arm |
| 16 | power takeoff mechanism |
| 18 | generator, motor generator, electricity generator |
| 19 | crank arm |
| 20 | body, leading form, leading element, first airfoil element, first portion |
| 22 | flap, trailing element, tail, second airfoil element, second portion |
| 23 | fin |
| 24 | hinge, pivot |
| 25 | trim bias, trim bias member, trim bias element |
| 26 | hinge axis, spar |
| 28 | mast pivot axis |
| 30 | clockwise clutch |
| 32 | counterclockwise clutch |
| 34 | bevel gear |
| 36 | gearbox |
| 40 | convex surface |
| 42 | standard airfoil |
| 44 | high lift region |
| 46 | transition region |
| 48 | inversion region |
| 50 | first element |
| 52 | second element |
| 54 | third element |
| 56 | fourth element |
| 58 | fifth element |
| 60 | gear mechanism |
| 62 | linkwork mechanism |
| 63 | fabric, fabric-like material |
| 64 | body frame |
| 66 | flap frame |
| 70 | body axis |
| 72 | limit of flap travel |
| 74 | weight |
| 76 | actuator |
| 77 | tower structure, tower housing, tower support, stationary support tower |
| 79 | leading edge |

DETAILED DESCRIPTION OF THE INVENTION

Referring to FIG. 1, a preferred embodiment of system 10 is presented. In this embodiment, system 10 comprises wing structure 12, mast 14, power takeoff mechanism 16 and generator 18. Preferably, wing structure 12 comprises body 20 and flap 23 with flap 23 being connected to body 20 by means of hinge 24 having hinge axis 26. Body 20 is preferably fixed to sleeve 13 which rotatably mounted on mast 14, and which oscillates around mast pivot axis 28 during operation of system 10. Power takeoff mechanism 16 preferably comprises two overrunning clutches (clockwise clutch 30 and counterclockwise clutch 32), bevel gear 34 and gearbox 36, although any mechanism for converting oscillating motion into rotary motion would suffice. Generator 20 preferably yaws with the wind direction. The stacked and opposing overrunning clutches 30 and 32 are driven by pinions (not shown) attached to sleeve 13. These clutches in turn drive bevel gear 34. This in turn drives gearbox 36 and motor generator 18.

Referring to FIG. 2, cross sectional views of wing structure 12 of the preferred embodiment of FIG. 1 are presented. In FIG. 2A, stand-off arm 15 is shown fixed to sleeve 13 and pivotably attached to fin 23. FIG. 2B is a cross sectional view of the trailing edge of another preferred embodiment of the wing structure of the invention, the trailing edge comprising a spring-loaded trim bias member. FIG. 2C is a cross sectional view of the trailing edge of another preferred embodiment of the wing structure of the invention, the trailing element edge comprising a permanent trim bias member.

Referring to FIG. 3, a time lapse view of eight steps in the oscillation cycle of wing structure 12 is presented. In this view, a half cycle is reached at step E.

Figure 4:
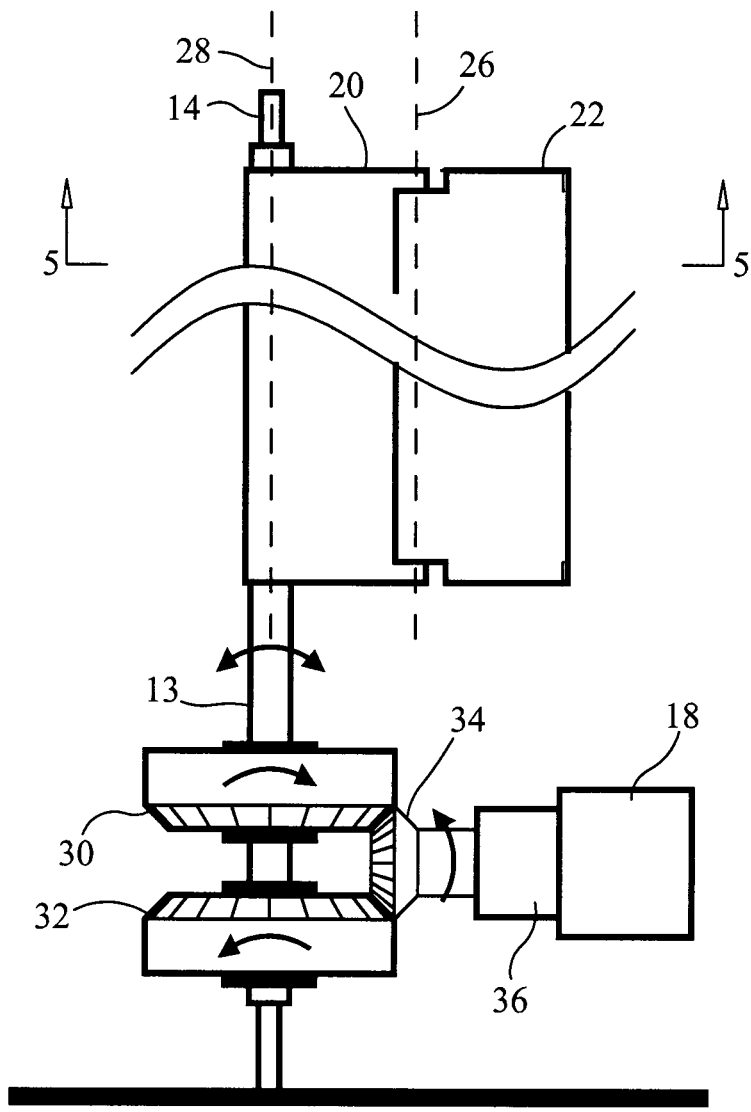
FIG. 4 is an elevation view of another preferred embodiment of the invention.

Referring to FIG. 4, another preferred embodiment of system 10 is presented. In this embodiment, system 10 comprises wing structure 12, mast 14, power takeoff mechanism 16 and generator 18. Preferably, wing structure 12 comprises body 20 and flap 22 with flap 22 being connected to body 20 by means of hinge 24 having hinge axis 26. Body 20 is preferably fixed to sleeve 13.

Figure 5:
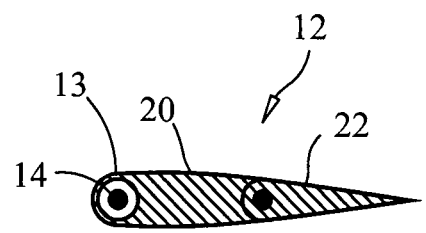
FIG. 5 is a cross sectional view of the wing structure of the preferred embodiment of the invention of FIG. 4.

Referring to FIG. 5, a cross sectional view of wing structure 12 is presented. Body 20 is shown fixed to sleeve 13 and pivotably attached to flap 22.

Figure 6:
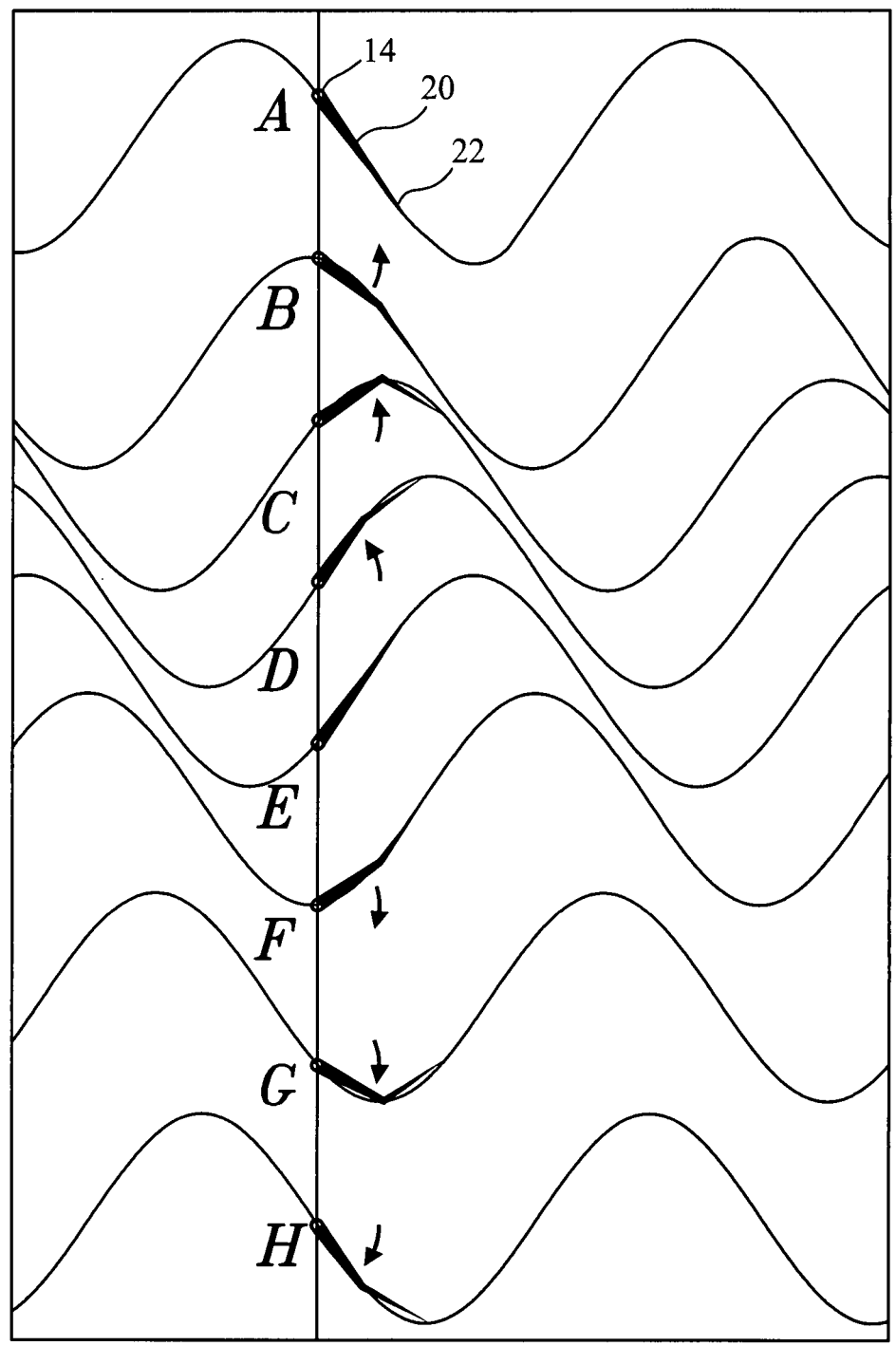
FIG. 6 is a time lapse view of eight steps in the oscillation of the wing structure of the preferred embodiment of the invention of FIG. 4.

Referring to FIG. 6, a time lapse view of eight steps in the oscillation cycle of wing structure 12 is presented. In this view, a half cycle is reached at step E.

Figure 7:
FIG. 7 is top cross sectional view of a convex surface of a preferred embodiment of the invention.

Referring to FIG. 7, convex surface 40 illustrates a shape of wing structure 12 at a point in its oscillation in accordance with a more preferred embodiment of the invention. Convex surface 40 acts as the low pressure, high lift region of an airfoil in accordance with a preferred embodiment of the invention. Convex surface 40 is derived from standard airfoil 42, in a preferred embodiment, airfoil GO7955, that is also shown in FIG. 7 and that is one of a large family of airfoils (referenced in the software VisualFoil V.4.1 by Hanley Innovations of Ocala, Fla., 34483, the disclosure of which is incorporated by reference as if fully set forth herein). The term "maximum chord thickness" and "maximum camber" are defined in the software. In this embodiment, a user of the software gives standard airfoil 42 a maximum chord thickness of about three percent and maximum camber of about thirty percent to produce convex surface 40, which represents a maximally pivoted configuration of an articulated lifting (airfoil) surface in accordance with the invention, at one end point of an oscillation.

A variety of methods can be used to determine airfoil shapes. A person skilled in the art would know that research documents of the National Aeronautic and Space Administration (NASA) and its predecessor, the National Advisory Committee for Aeronautics (NACA), may be used to determine airfoil shapes and their characteristics. A selection of shapes based upon desired lift/drag characteristics for given wind speeds is made, and this preferably determines the shape of a single fin system or a multiple element system. One of the shapes used herein, airfoil GO7955, is but one example. Another example based upon a modification of the CLARK Y airfoil is given in FIG. 41. Yet another example based upon a modification of NACA 0012 airfoil is given in FIGS. 51A and 51B. An approximation to the choice is then made with either a single or multi-element form. The airfoil shape can change along the length of the fin system, each cross-section determined by an optimal airfoil choice based upon the wind gradient given for a chosen site.

Figure 8:
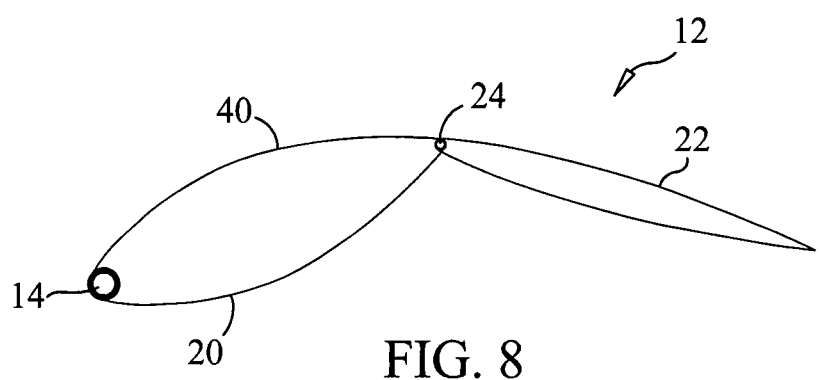
FIG. 8 is a top cross sectional view of another articulated wing structure of a preferred embodiment of the invention.

Referring to FIG. 8, another embodiment of the articulated wing structure 12 of FIG. 4 is presented in cross section at one end point of an oscillation. In this embodiment, articulated wing structure 12 comprises leading element 20 and trailing element 22. Trailing element 22 is preferably joined to leading element 20 by hinge or pivot 24. In this embodiment, articulated wing structure 12 is capable of taking a maximally pivoted configuration that produces a lifting contour that is an approximation of the desired shape of convex surface 40 shown in FIG. 7, at the segment of highest lift shown in 44 of FIG. 9. Preferably, wing structure 12 is allowed to flex as well as rotate freely about mast 14 on sleeve 13.

Figure 9:
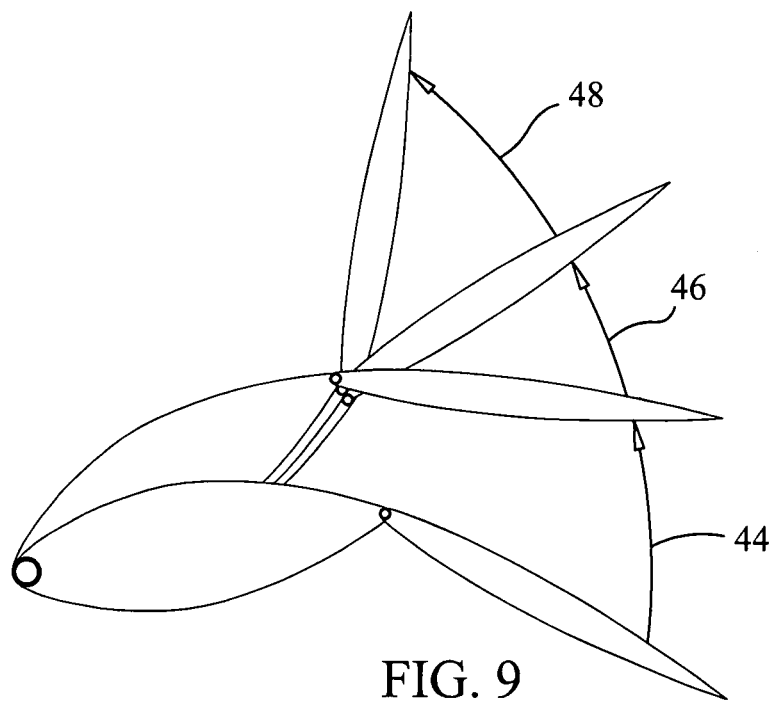
FIG. 9 is a plan view of a superimposition of the images of the four stages of oscillation of the wing structure of a preferred embodiment of the invention.

Referring to FIG. 9, a superimposition of the stages 1-4 of oscillation of wing structure 12 is presented. In high lift region 44 of the swing (changing the angle of attack of the shape between first stage 1 and second stage 2) in the fluid stream, mechanism 12 exhibits the greatest efficiency: least drag, highest lift. For the remainder of the swing, a transition to the inverted form occurs in transition region 46 between second stage 2 and third stage 3, with the lift generating capability declining to zero and then reversing between third stage 3 and fourth stage 4 in inversion region 48.

Figure 10:
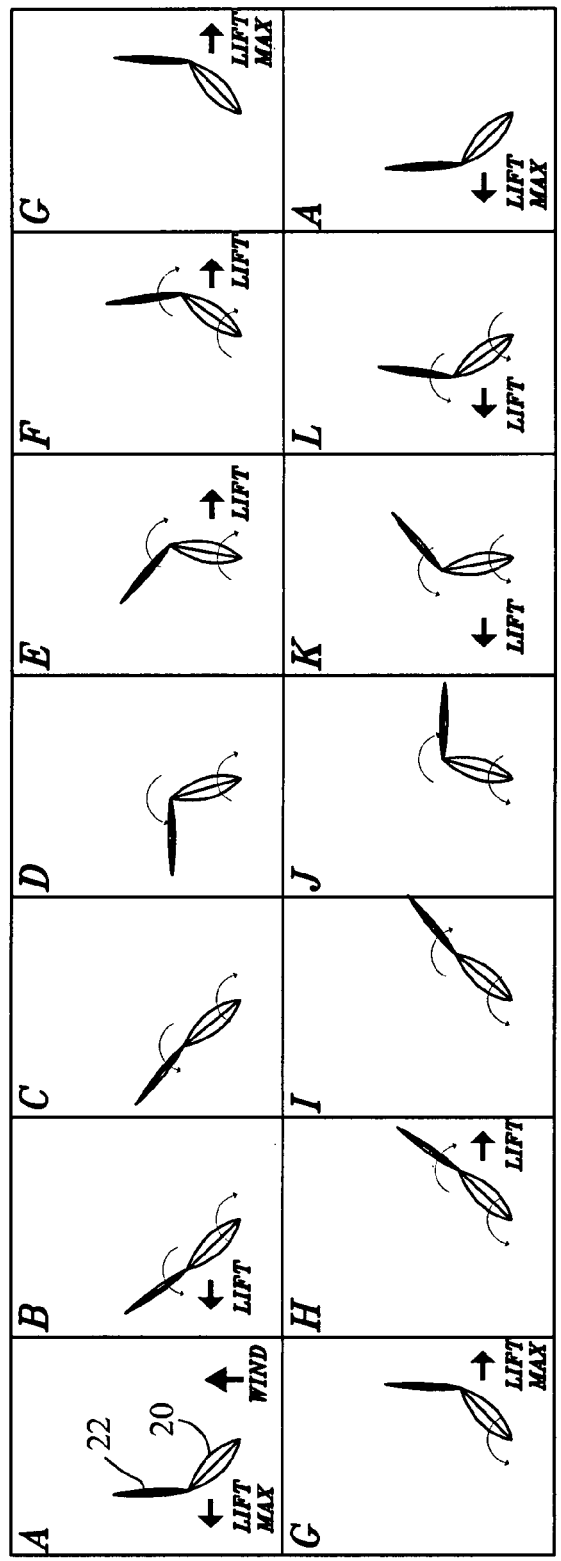
FIG. 10 is a plan view of the configurations taken by the leading element and the trailing element of a preferred embodiment of the invention over a full oscillation cycle.

Referring to FIG. 10, full oscillation cycle is illustrated, with highest lift achieved in configurations A-B and E-G, then G-H and K-A. Essentially no lift is generated in configurations C-D and I-J. The wind blows from below.

Figure 11:
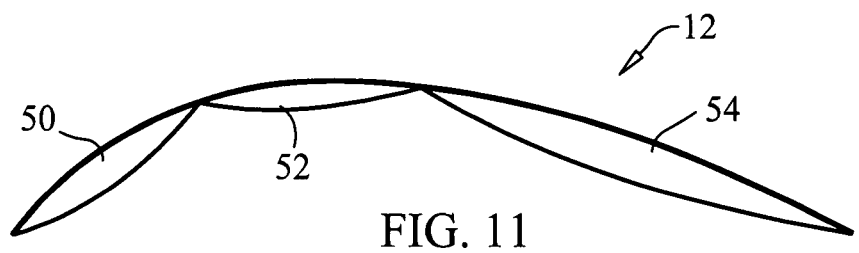
FIG. 11 is a plan view of a preferred three element embodiment of the invention with the elements aligned in a desired configuration that maximizes lift.

Referring to FIG. 11, a preferred three-element embodiment of articulated wing structure 12 is illustrated. Here, articulated wing structure 12 comprises first element 50, second element 53 and third element 54. With this embodiment, a closer approximation of the desired shape (illustrated in FIG. 7) is achieved by incorporating more than two elements into articulated wing structure 14.

Figure 12:
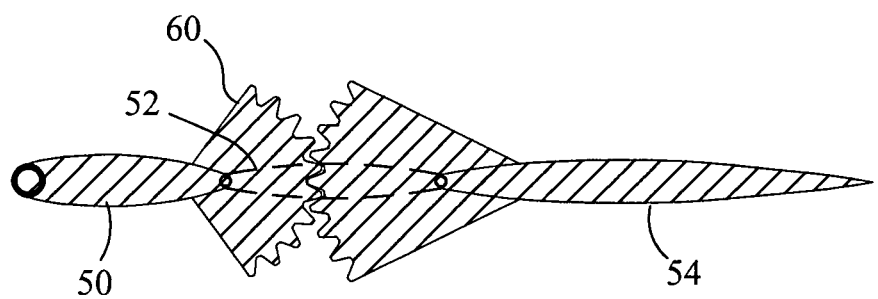
FIG. 12 is a plan view of a preferred embodiment of the invention having a gearing arrangement.

In a preferred embodiment, embodiments of mechanism 12 having more than two elements are constrained to adopt a preferred airfoil shape. In one preferred embodiment, illustrated in FIG. 12, this is done with a geared arrangement.

Figure 21:
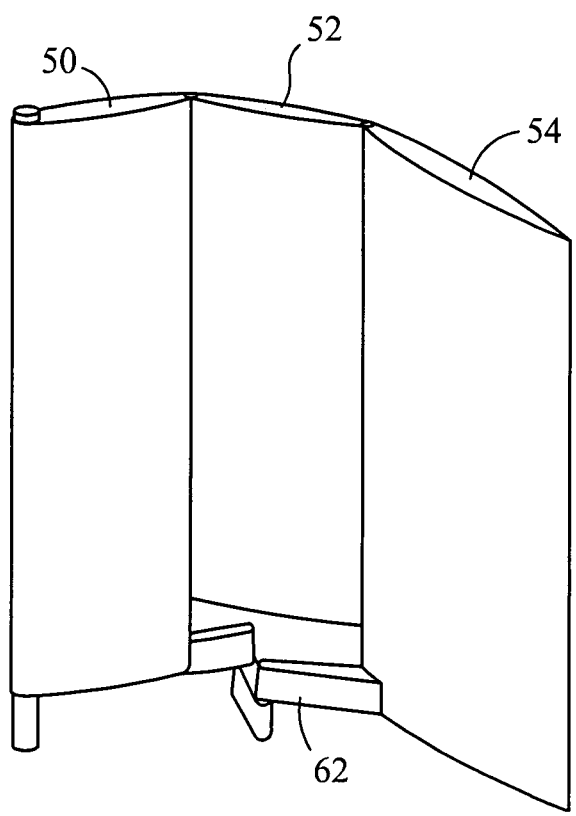
FIG. 21 is a perspective view of a preferred three element embodiment of the invention having a linkwork arrangement.

In another preferred embodiment, illustrated in FIG. 21, this is done with a linkwork arrangement. The gearing or linkwork arrangement preferably has the following two properties: (1) it constrains the form to either a convex or concave shape, and (2) it ties each element downstream of first element 50 to first element 50 and thereby transfers forces affecting each element to the first one. Power is preferably extracted from first element 50.

Figure 13:
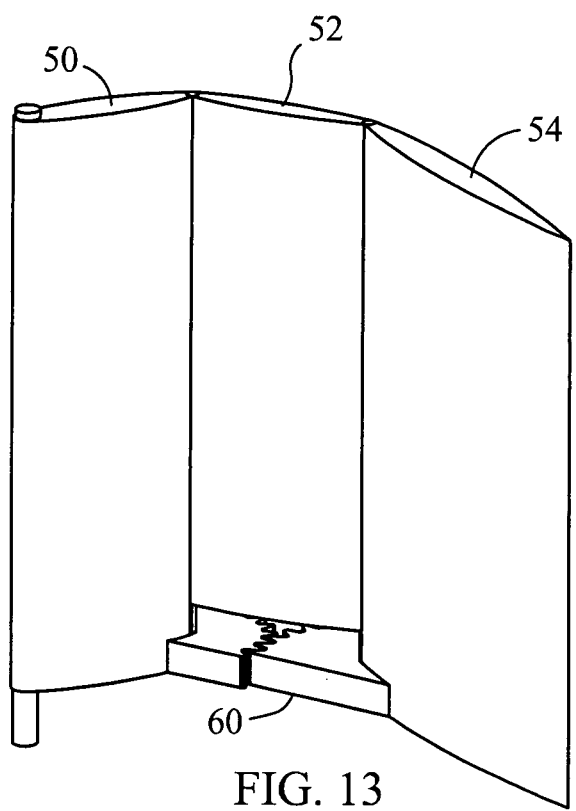
FIG. 13 is a perspective view of a preferred embodiment of the invention having a gearing arrangement.
Figure 14D:
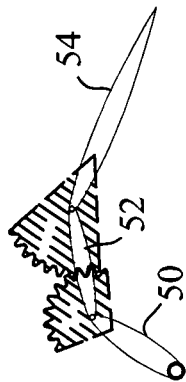
FIGS. 14A through 14D are plan views of a preferred embodiment of the invention illustrating how the gearing arrangement constrains the form of the invention and transfers forces.
Figure 14C:
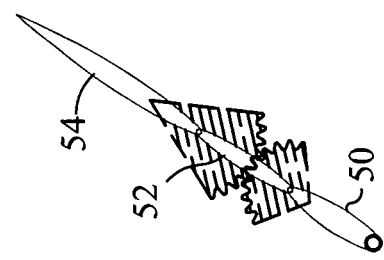
Figure 14B:
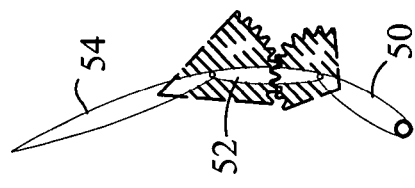
Figure 14A:
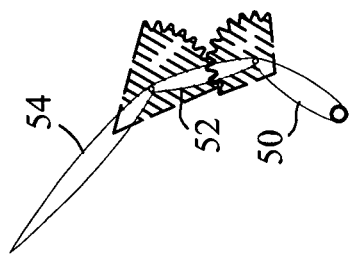

As illustrated in FIG. 13, with a preferred embodiment of a gearing arrangement, gearing links alternate elements: e.g., for three elements 50, 52, 54, the linkage is element 50 to element 54. A preferred geared or linkwork system is located at several points along the length (vertical extent) of a vertical embodiment of wind fin 12, the number of gears and their placement to depend on the height of wind fin 12.

Gear linking can have a variety of configurations. Referring to FIGS. 14A, 14B, 14C and 14D, a portion of the oscillation sequence is shown for a three-element embodiment with gear linking (as was shown for a different embodiment in FIG. 9). This particular approximation is carried out with a preferred geared mechanism that exhibits a linear and equal angular rate of change of the angular orientations of elements 50, 52 and 54.

The term "linear" means that an output is a constant multiple of an input. With a linear and equal gear arrangement, two gears of the same diameter are used. With a linear and unequal gear arrangement, two gears of different diameters are used. With a nonlinear linkwork arrangement, the angular output varies over the oscillation with an unvarying input.

Figure 15:
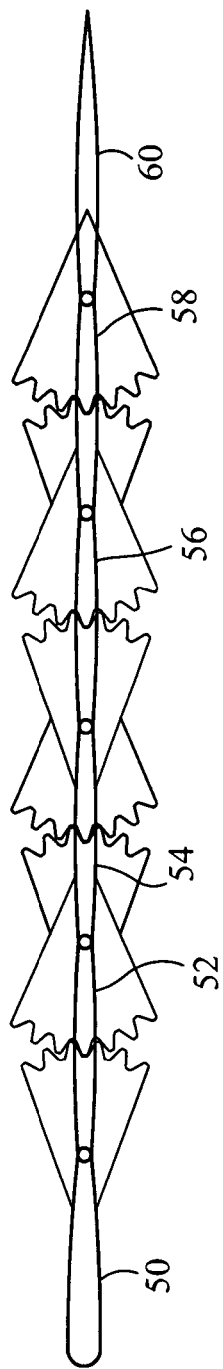
FIGS. 15 through 18 are plan views of a preferred six element embodiment of the invention having a geared arrangement. For clarity only some of the gears are shown on FIGS. 16 and 17.
Figure 16:
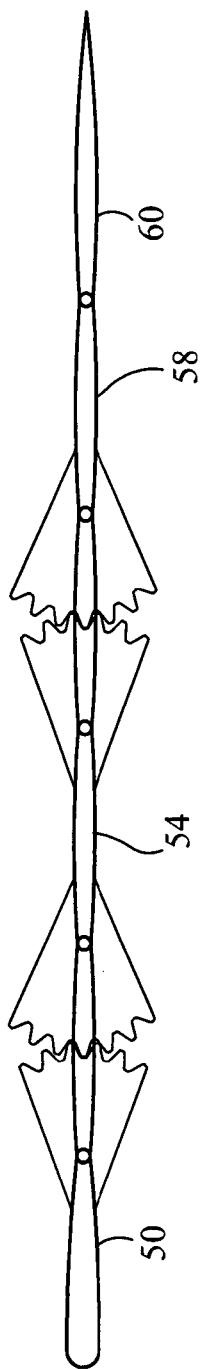
Figure 17:
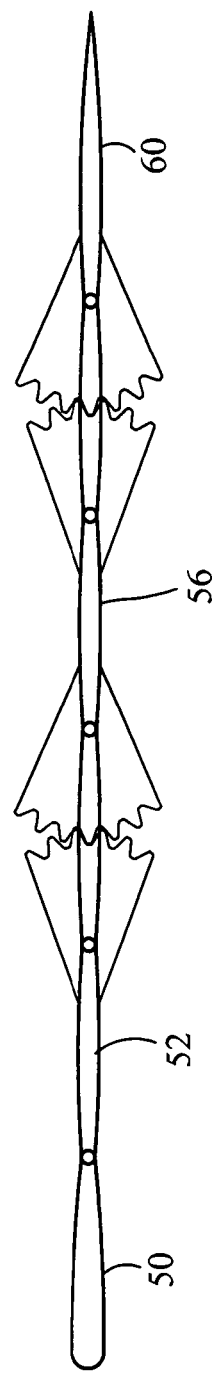
Figure 18:
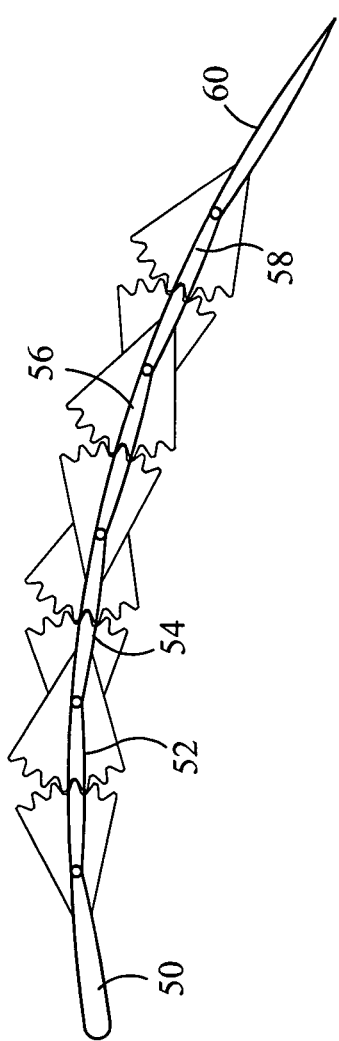
Figure 19C:
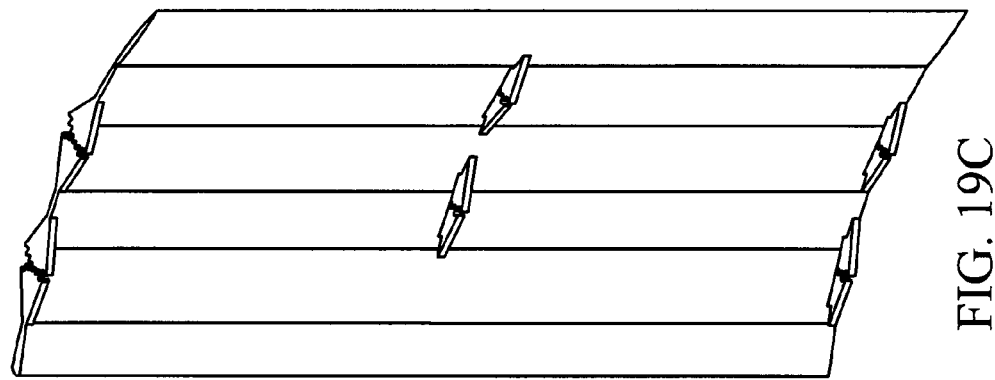
FIGS. 19A, 19B and 19C are three perspective views, at three different points in an oscillation, of a preferred six element of the invention having a geared arrangement.
Figure 19B:
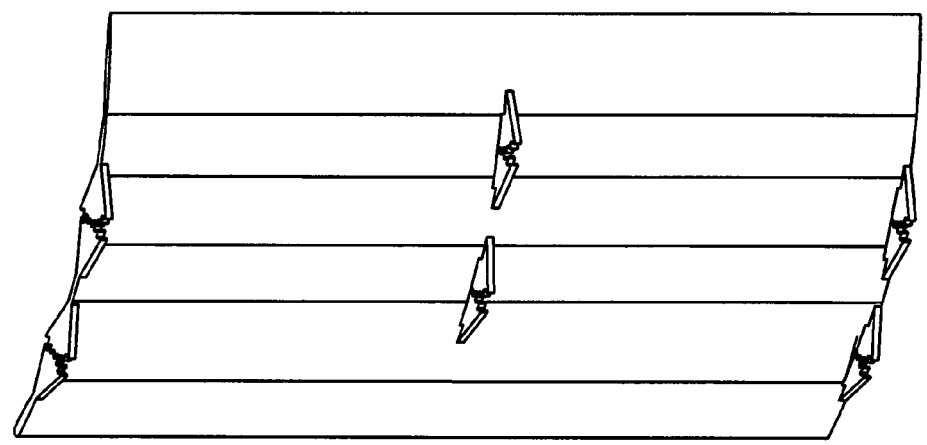
Figure 19A:
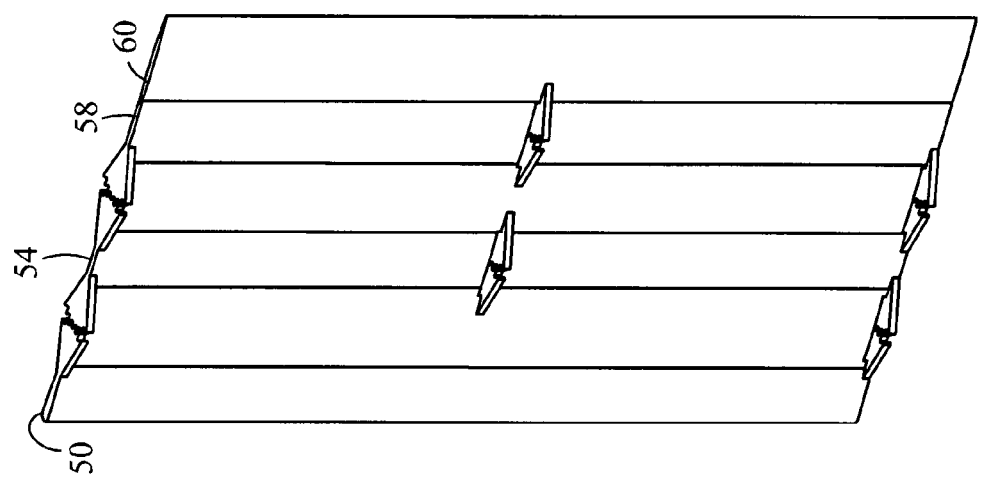
Figure 20D:
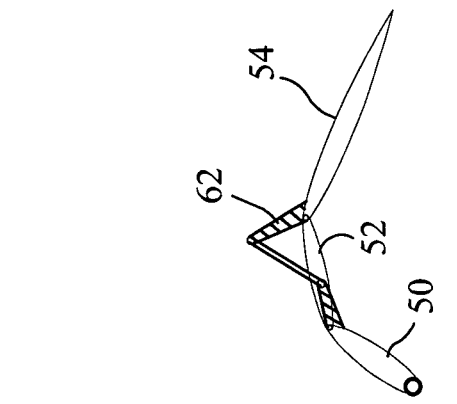
FIGS. 20A, 20B, 20C and 20D are plan views of a preferred three element embodiment of the invention having a linkwork arrangement, with the elements shown at a different stage of an oscillation sequence in each view.
Figure 20C:
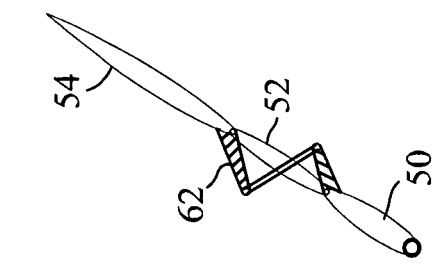
Figure 20B:
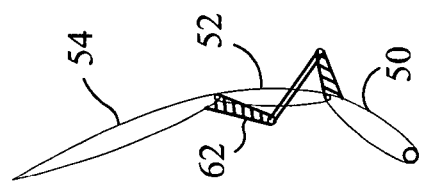
Figure 20A:
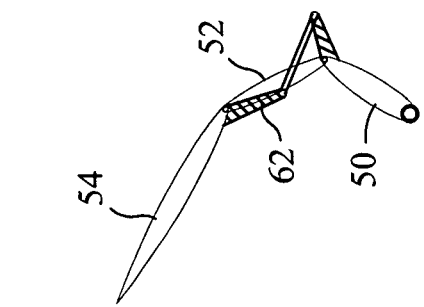

In FIG. 15, six elements 50, 52, 54, 56, 58 and 60 are linked by gear tying elements 50 and 54, 52 and 56, 54 and 58 and 56 and 60. For multiple element systems, a gearing linkage would be E1-E3, E2-E4 . . . EN-E(N+2). In FIG. 16, for clarification the gearing of three elements 50, 54, 58 are linked by gears linking elements 50 and 54 and 54 and 58. In FIG. 17, for clarification, the gearing of three elements 52, 56, 60 are joined by gears tying elements 52 and 56 and 56 and 60. In FIG. 18, all six elements 50, 52, 54, 56, 58 and 60 are shown in flexure: tied by gears linking elements 50 and 54, 52 and 56, 54 and 58 and 56 and 60. Referring to FIGS. 19A, 19B and 19C, even element to odd element gearing staggered by height, is illustrated.

Figure 22:
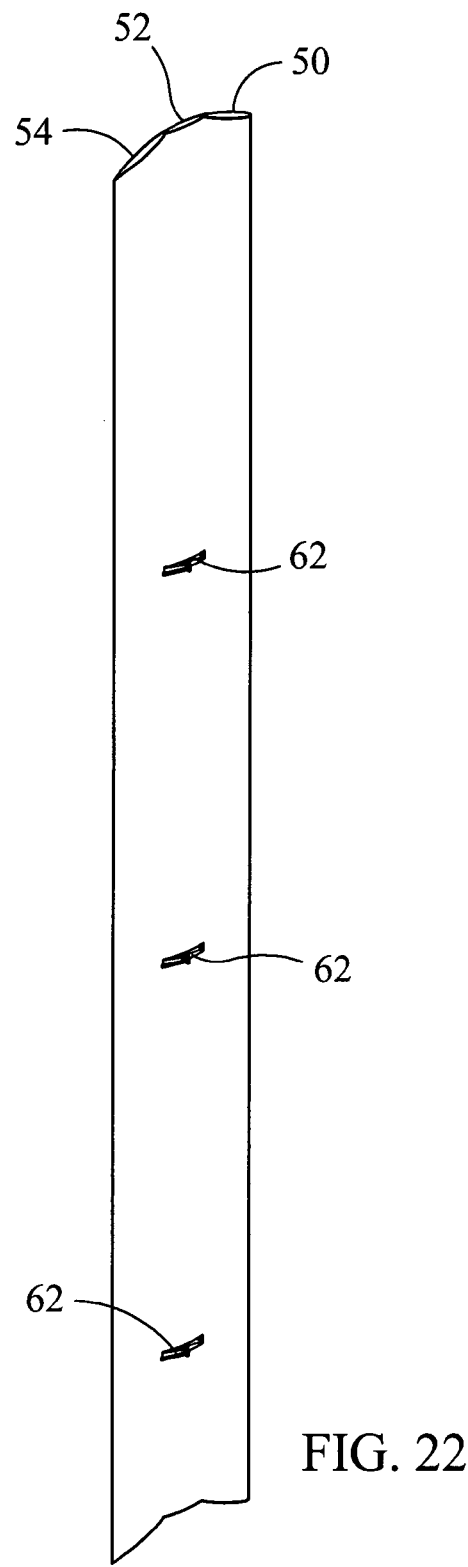
FIG. 22 is a perspective view of a tall and thin form of a preferred three element embodiment of the invention having a linkwork arrangement.

Referring to FIGS. 20A, 20B, 20C and 20D, a portion of the oscillation sequence for a linkwork arrangement is shown. In FIGS. 21-22, other preferred embodiments of a linkwork arrangement are illustrated. This approximation is carried out with a preferred linkwork mechanism that exhibits a linear and equal angular rate of change of the angular orientations of elements 50, 52 and 54.

FIG. 21 illustrates a preferred method of constraining three elements with a linkwork arrangement to either a convex or concave form, which approximates the preferred shape illustrated in FIG. 11. This approximation is carried out with a linkwork arrangement that exhibits a non-linear and unequal angular rate of change of the angular orientations of elements 50, 52 and 54. FIG. 22 illustrates a preferred tall and thin form of a three element mechanism with linkwork arrangement. Other geared and multiple element sets are possible but not illustrated.

Referring to FIGS. 24A-24H and 52, preferred embodiments of wind power generator 10 are illustrated. Embodiments of wind power generator 10 may be designed to be far more attractive than a conventional horizontal-axis wind turbine. This is an important consideration in gaining public acceptance of wind power systems and approval for wind power projects in the face of community resistance.

Figure 23:
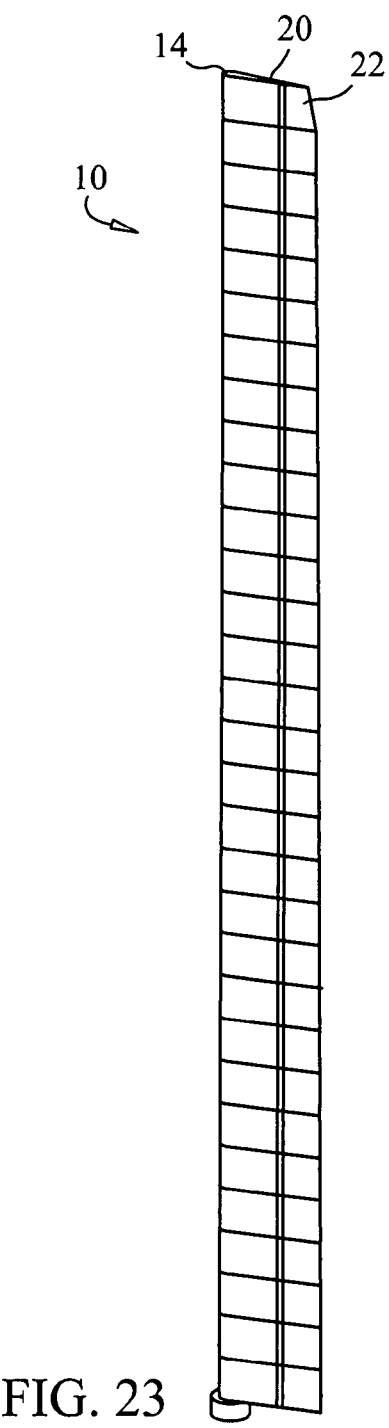
FIG. 23 is a perspective view of a tapered form of a preferred two element embodiment of the invention.
Figures 24A, 24B, 24C, 24D:
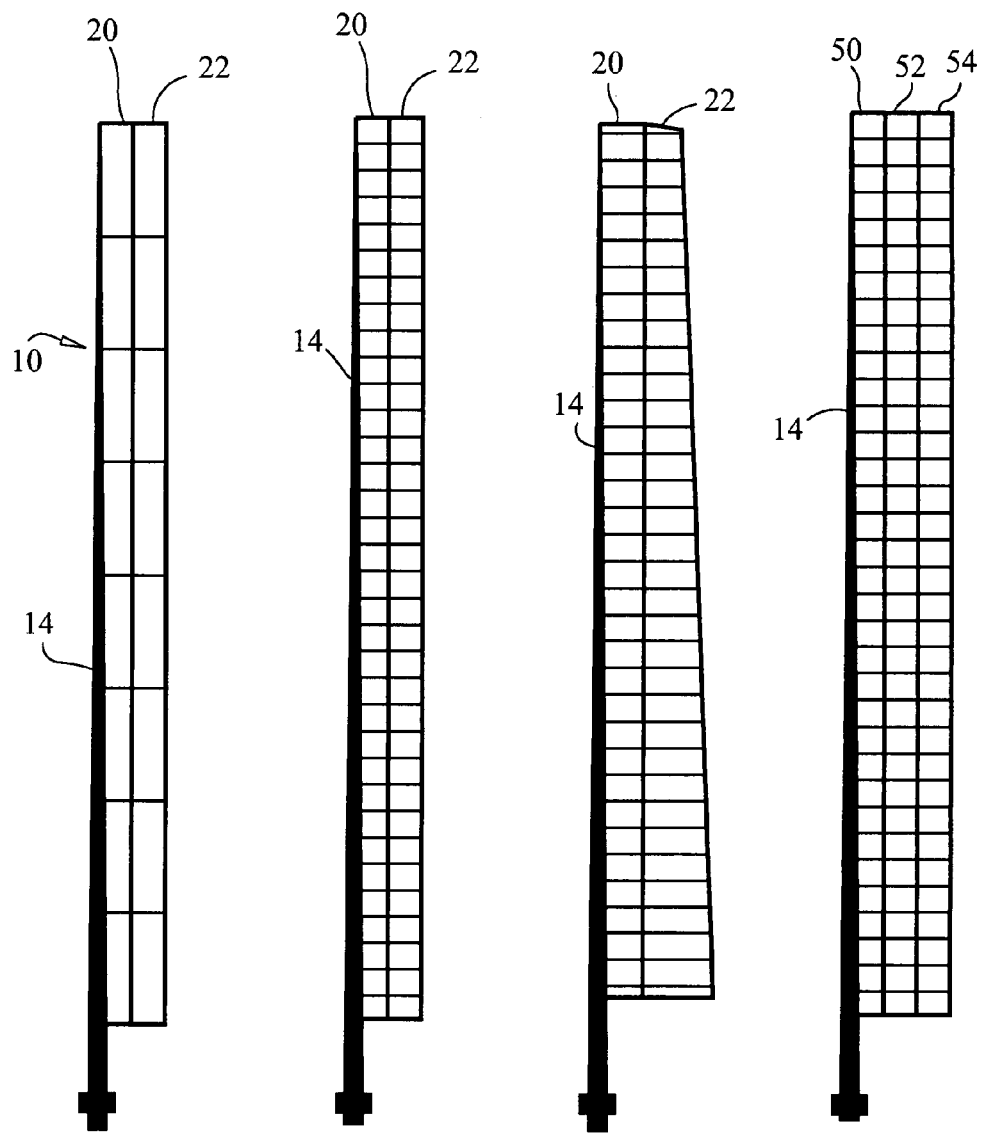
FIGS. 24A through 24H are elevation views of preferred embodiments of the invention.
Figure 24E:
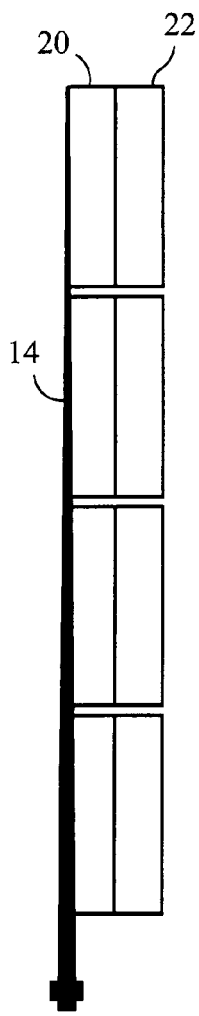
Figure 24F:
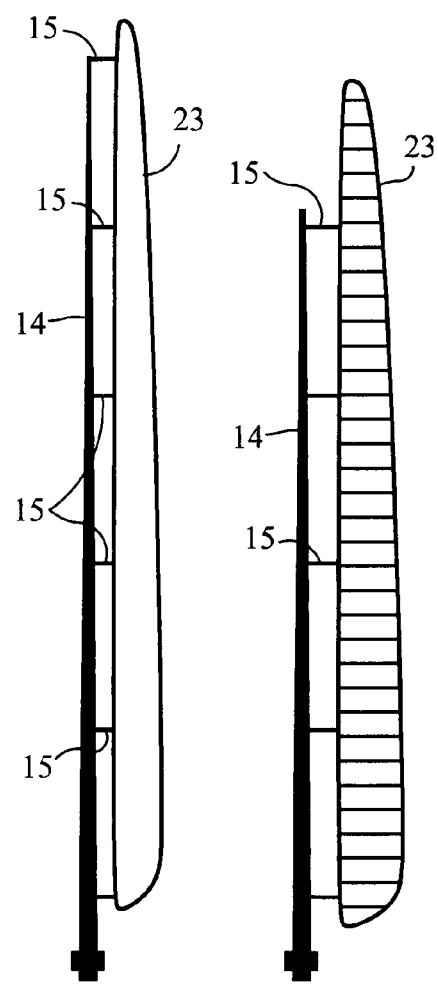
Figure 24G:
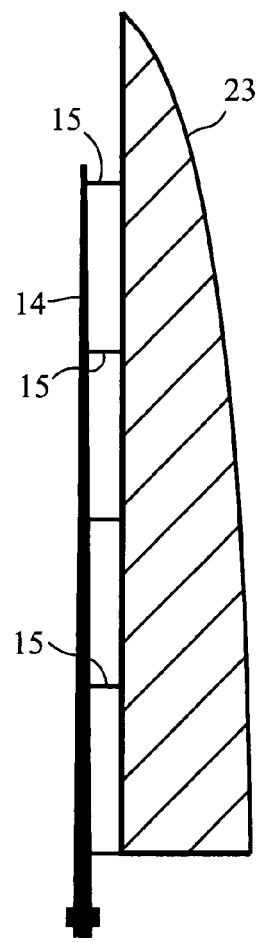
Figure 24H:
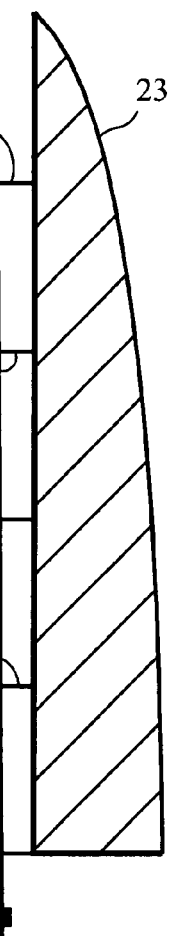
Figure 25A:
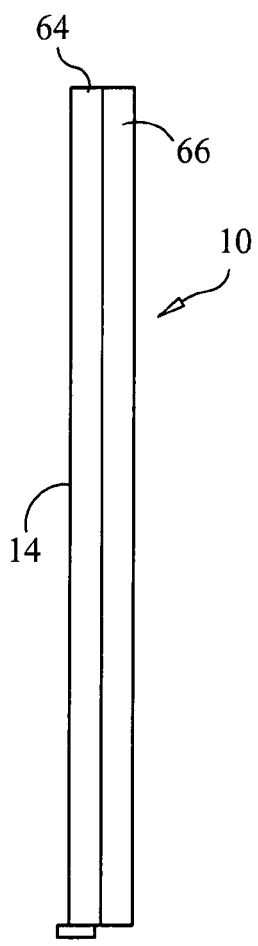
FIGS. 25A and 25B are elevation views of embodiments of the invention constructed of a rigid sheet of lightweight material within an articulated framework.
Figure 25B:
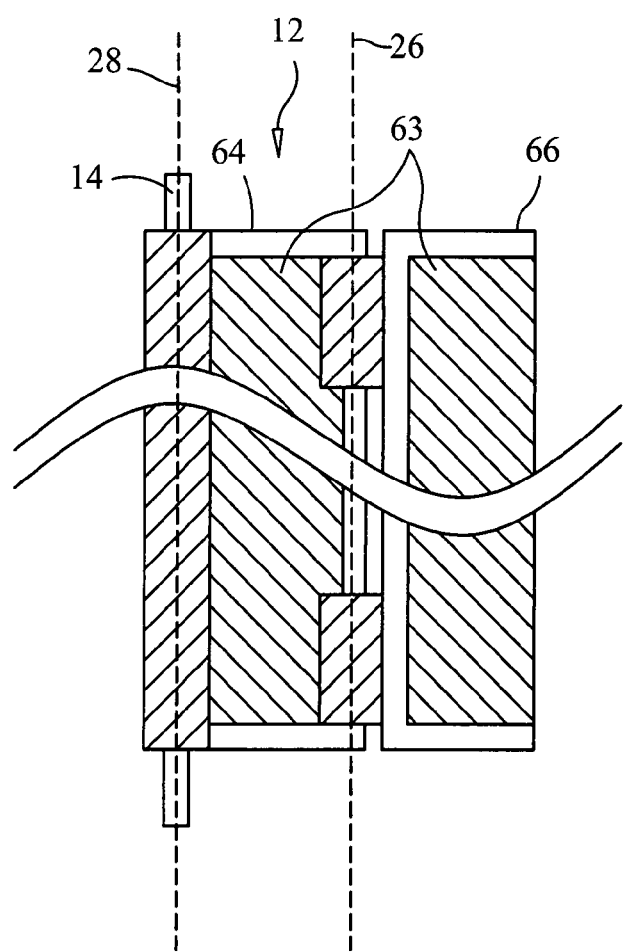

Referring to FIG. 23, a preferred embodiment of wind power generator system 10 includes mast 14 and wing structure 12 comprising leading element 20 and trailing element 22. FIGS. 24A, 24B, 24C, 24D and 24E illustrate alternative embodiments of system 10. In the embodiment shown in FIG. 24E, wing section 24 is divided vertically into a plurality of sections. In one preferred embodiment these sections are independent, and in another preferred embodiment they are tied together. Referring to FIGS. 24F, 24G, 24H and 52, other preferred embodiments of wind power generator system 10 include mast 14 and wing structure 12 comprising a single aerodynamic fin 23 connected to mast 14 by at least two stand-off arms 15. Elements 20 and 22 of wing structure 12 or fin 23 of wing structure 12 can be constructed like an aircraft wing with a skin that conforms to symmetrical wing ribs or a molded foam core; this skin can be made of fiber reinforced plastic (such as glass reinforced plastic or carbon fiber reinforced plastic), an aircraft fabric covering product (such as Ceconite®), aluminum, or ripstop nylon; in addition, wing structures can be designed to be a self-inflating airfoil, like a parafoil, comprising rows of cells that are open at the front and joined together side by side such that a moving fluid stream keeps the cells inflated. Alternatively, as shown in FIGS. 25A and 25B, elements 20 and 22 can be constructed of a rigid sheet of lightweight material 63 within 64 body frame and flap frame 66.

Referring to FIG. 26, another preferred embodiment of wing section 12 is illustrated. In this embodiment, the length of leading element 20 is approximately equal to the length of trailing element 22. In preferred embodiments, the momentum of wing structure 12 movement affects a shift in the position of flap 22, which is shown over a complete oscillation in FIG. 6 and sequence in the time sequence diagrams, FIGS. 27-30. As illustrated in FIG. 27, upon perturbation of wing structure 12, body 20 and flap 22 rotate counterclockwise around mast pivot axis 28 because lift acts on the convex side of wing structure 12. At the maximum extent of counterclockwise rotation shown in FIG. 28, momentum carries flap 22 past body axis to limit of flap travel 72 and the direction of lift changes and clockwise rotation begins. At an intermediate stage of clockwise rotation shown in FIG. 29, lift increases. At the end of clockwise rotation shown in FIG. 30, wing structure 12 moves into a configuration that is a mirror image of the configuration at the beginning of the oscillation cycle shown in FIG. 27.

Systems 10 may be positioned in clusters or individually. Also, they may be mounted at tops or edges of buildings. In preferred embodiments, system 10 generates power without posing the danger to birds or bats that a traditional horizontal-axis wind turbine poses.

Figure 31:
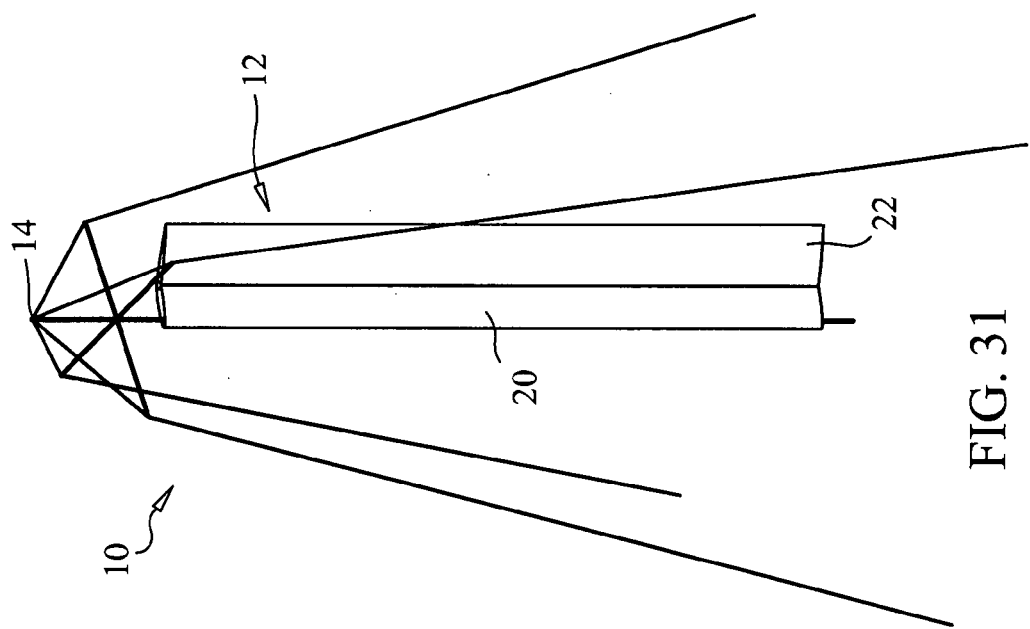

Referring to FIG. 31, another preferred embodiment of system 10 is illustrated that operates as a wind power generator on the basis of hinged wing structure 12 oscillating in the wind. In this embodiment, hinged wing structure 12 is connected to a mast 14 and comprises leading element 20 and trailing element 22. Leading element 20 preferably pivots about mast pivot axis 28 which is guyed by spar and guy wire set 11; while trailing element 22 pivots about hinge axis or spar 26. In preferred embodiments, the oscillating motion is self sustaining and needs no mechanical assist.

Figure 32:
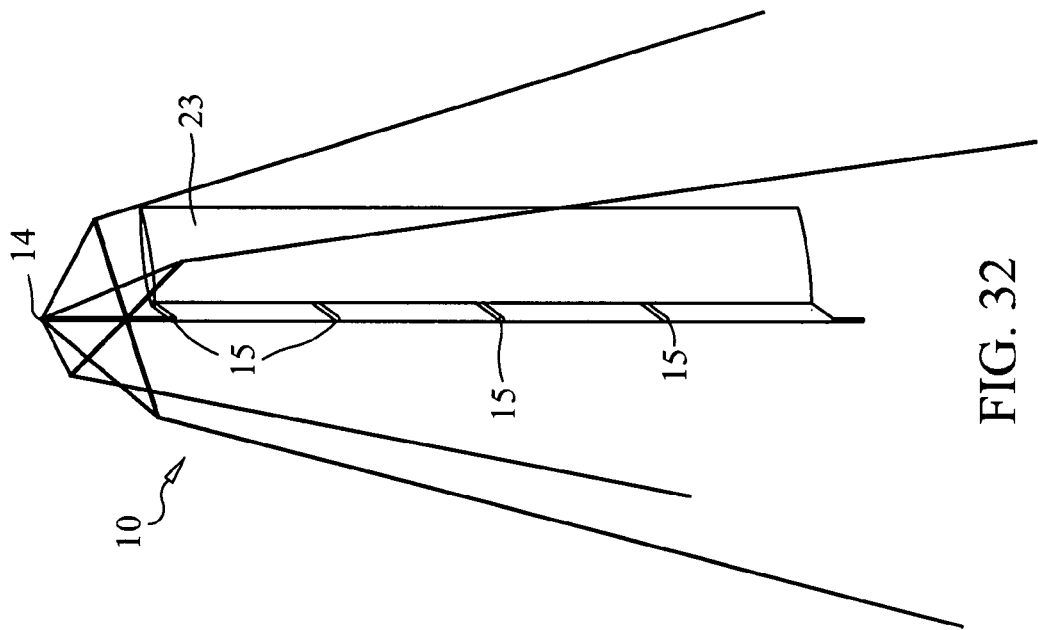
FIGS. 31 and 32 are perspective views of preferred embodiments of the invention that are guyed by spar and guy wire sets.

Referring to FIG. 32, another preferred embodiment of system 10 is an oscillating wind power generator 10 is illustrated that operates on the basis of fin 23 (e.g., a single body wing structure) attached to mast 14 by stand-off arms 15. The arms 15 pivot about the mast pivot axis 28 while single body wing structure or fin 23 pivots about hinge axis 26. In this embodiment, as in all preferred embodiments, the oscillating action is self sustaining and needs no mechanical assist. This system is also preferably guyed, as shown in FIG. 31.

Figure 33:
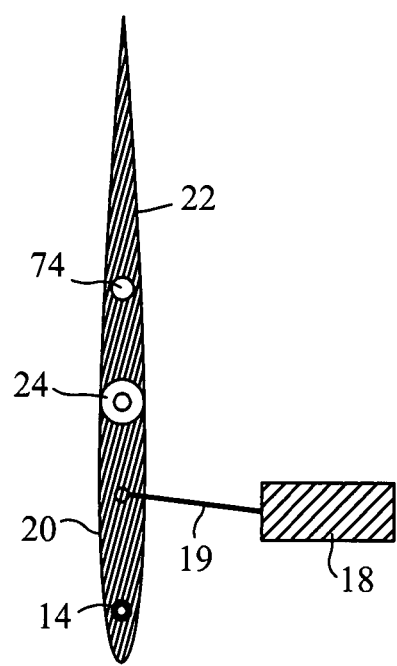
FIGS. 33 and 34 are plan views of another two preferred embodiments of the invention with a power take-off mechanism comprising a crank arm connected to an electricity generator.
Figure 34:
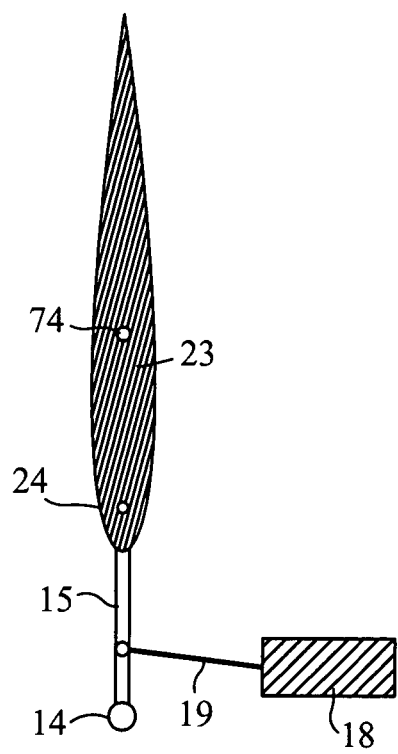

In preferred embodiments, moveable weights, shown in FIGS. 33 and 34, are included in at least some sections of trailing element 22 or fin 23 as a way to facilitate the oscillation and control the oscillation speed of wing structure 12. These weights are positioned in a controlled manner along a pathway transverse to mast 14, which would be horizontal in the embodiments shown. The pathways may be small tubes, in which the weights are resident, or tracks on which the weights are slidably but securely fastened. The weights would be moved toward the trailing edge of the airfoil to facilitate the oscillation of wing structure 12 and moved towards the center of mass of the airfoil to control the oscillation speed of wing structure 12. In one preferred embodiment, weight movement control is informed by a sensor assembly.

Referring to FIG. 33, a top view cross section of another preferred embodiment of the hinged wing structure of FIG. 31 shows leading element 20 fixed, on one side, to mast 14 and, on the other side, connected to trailing element 22 by pivot 24. Trailing element 22 includes weight 74 that facilitates the oscillating motion. Preferably, this weight can be moved towards the center of mass of the wing structure as a way to control its oscillation. Leading element 20 is connected to generator 18 by crank arm 19.

Referring to FIG. 34, a top view cross section of another preferred embodiment of the single body wing structure of FIG. 32 shows arm 15 fixed, on one side, to mast 14 and, on the other side, connected to fin 23 by hinge 24. Fin 23 includes weight 74 that facilitates the oscillating motion. Preferably, this weight can be moved towards the center of mass of the wing structure as a way to control its oscillation. Arm 15 is connected to generator 18 by crank arm 19.

Figure 35:
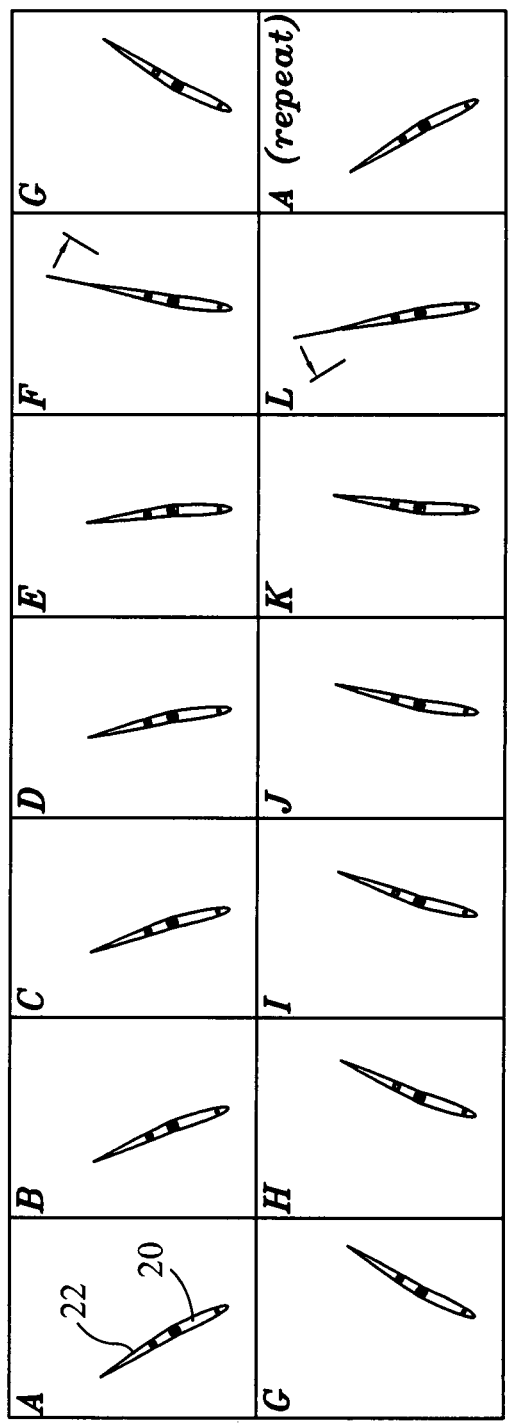
FIGS. 35 and 36 are sequence drawings of the steps in an oscillation of preferred embodiments of the invention.

Referring to FIG. 35, a sequence drawing of the steps in the oscillation of hinged wing structure 12 is presented. Steps F to G and steps L to A show transition portions of the oscillating sequence, in which the trailing element 22 of hinged wing structure 12 continues its rotation and the lift direction of the airfoil as a whole reverses.

Figure 36:
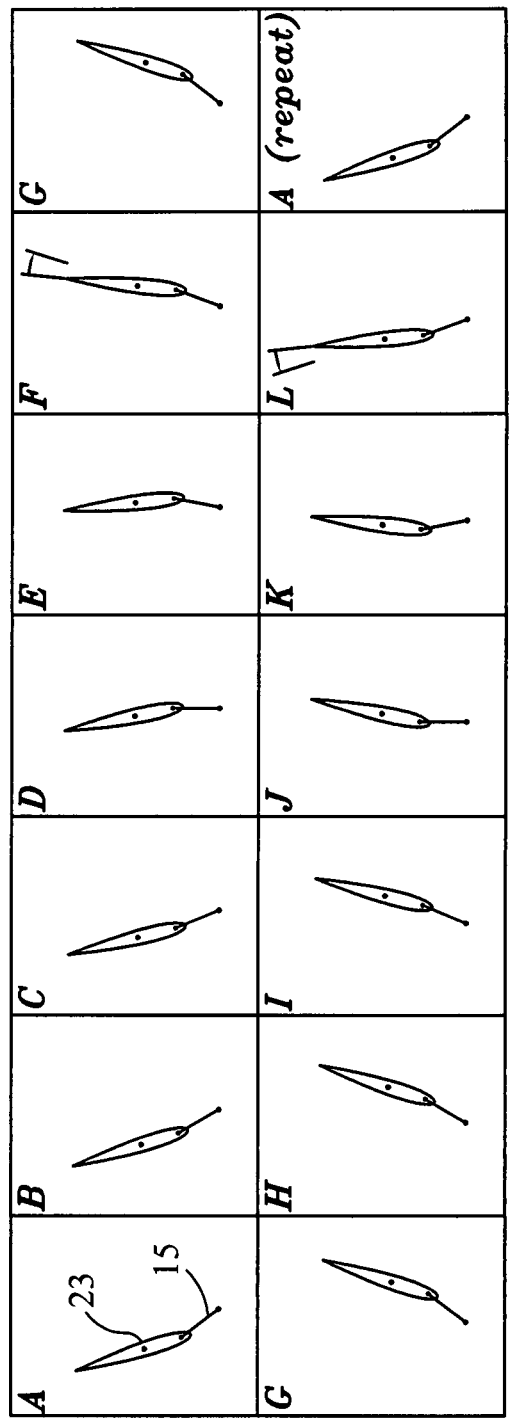
Figure 38:
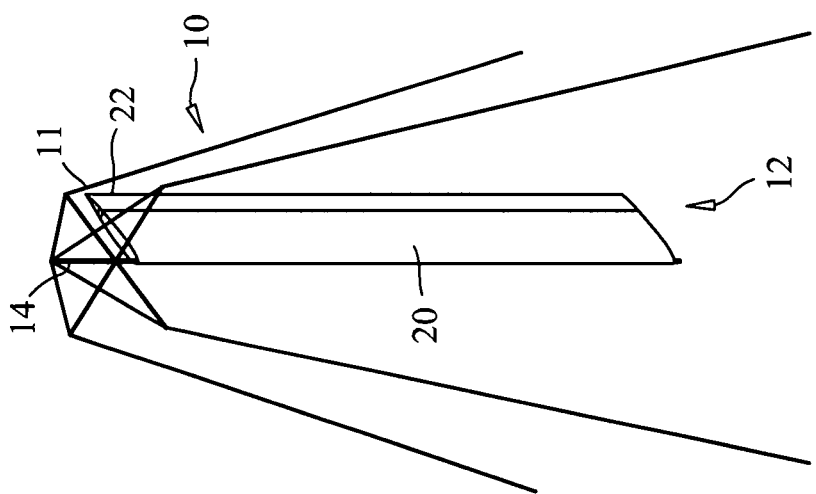
FIGS. 37-40 are perspective views of other preferred embodiments of the invention that are guyed by spar and guy wire sets.
Figure 37:
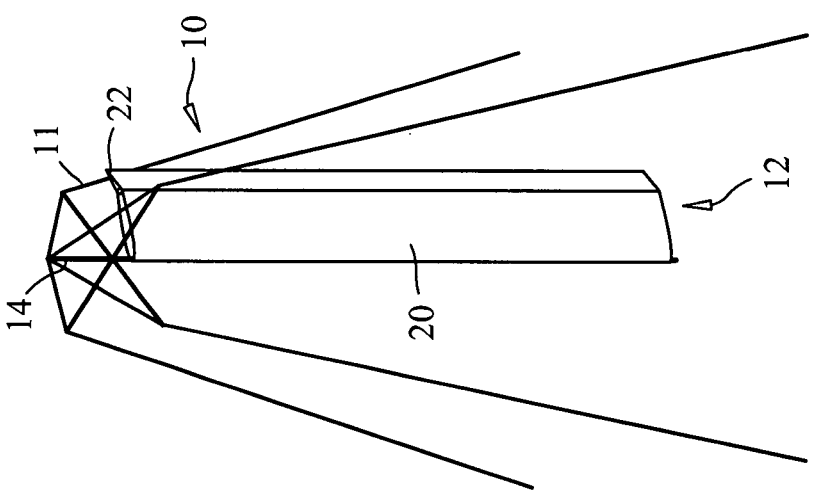
Figure 40:
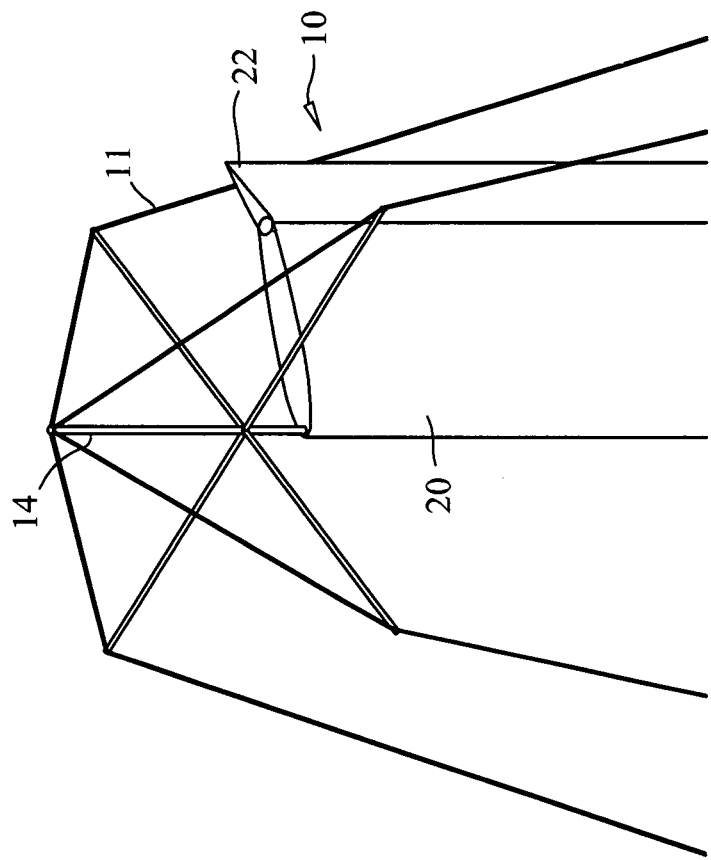
Figure 39:
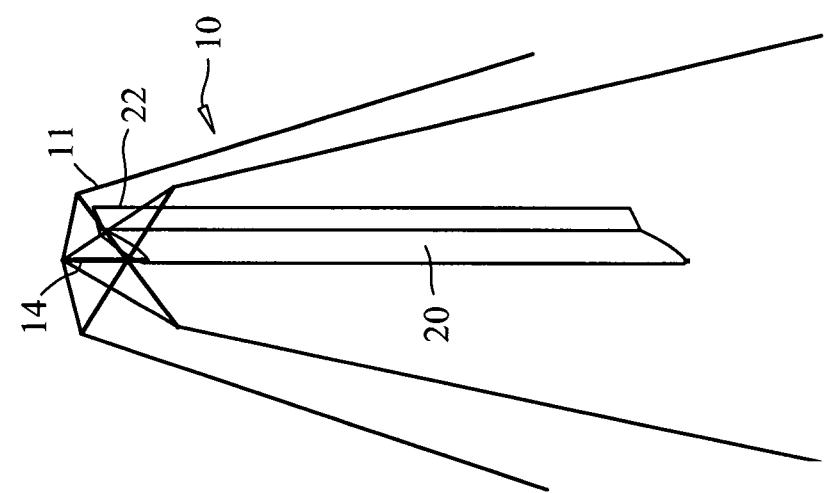

Referring to FIG. 36, a sequence drawing of the steps in the oscillation of the single body wing structure 23 is presented. Steps F to G and steps L to A show transition portions of the oscillating sequence in which the single body wing structure on a stand-off arm continues its rotation, and the lift direction of the airfoil as a whole reverses.

Referring to FIGS. 37-40, system 10 preferably includes frame 11 having mast 14 and wing structure 12 which comprises main body 20 and flap 22. Leading element 20 preferably pivots about pivot axis 28 at mast 14, which is guyed by spar and guy wire set 11.

Figure 41:
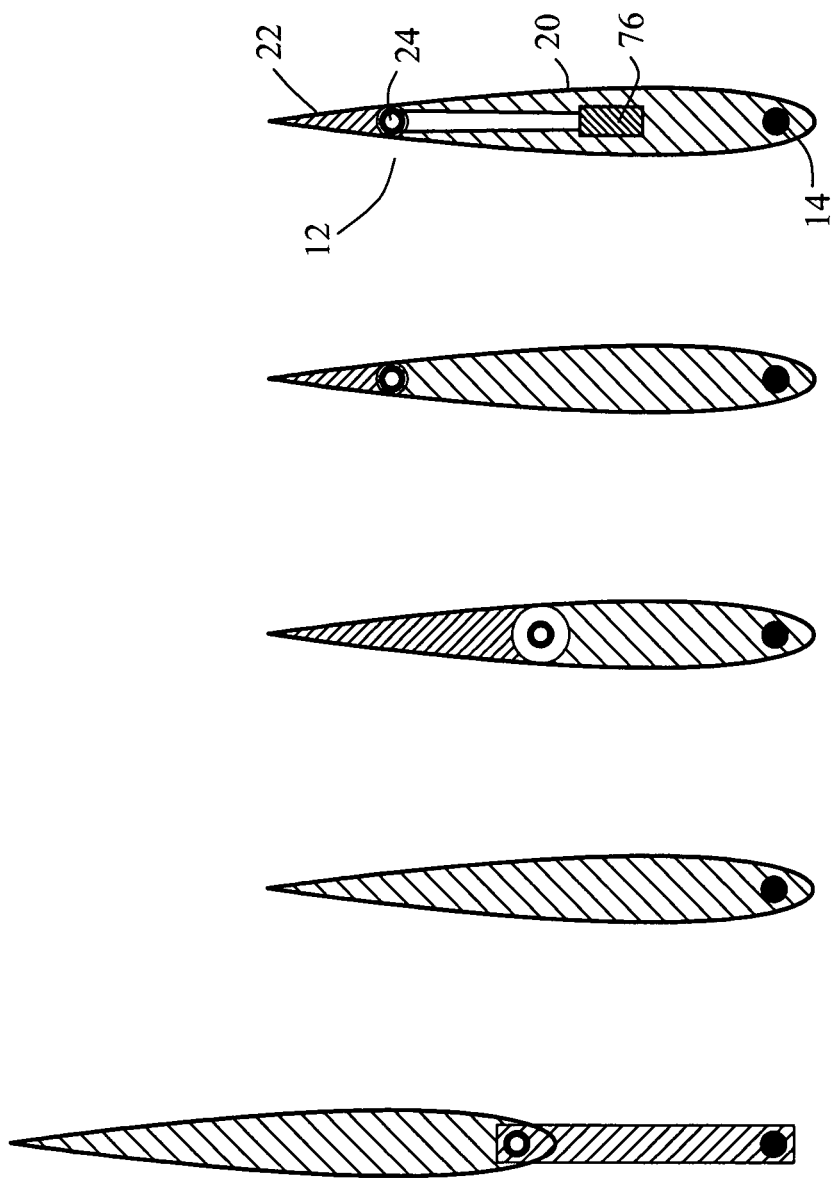
FIG. 41 presents cross sectional views of different embodiments of the wing structure.

Referring to FIG. 41, cross sections of different embodiments of wing structure 12 are illustrated. In a preferred embodiment, actuator 76 includes a number of sensors and possesses sufficient computing intelligence to determine a substantially optimal point in time to swing flap 22 or trim bias element 25 from one position to another, thereby facilitating the oscillating of wing structure 12. In another preferred embodiment, there is no such actuator and the momentum of wing structure 12 movement affects the shift in position of flap 22 or trim bias element 25.

Figure 42:
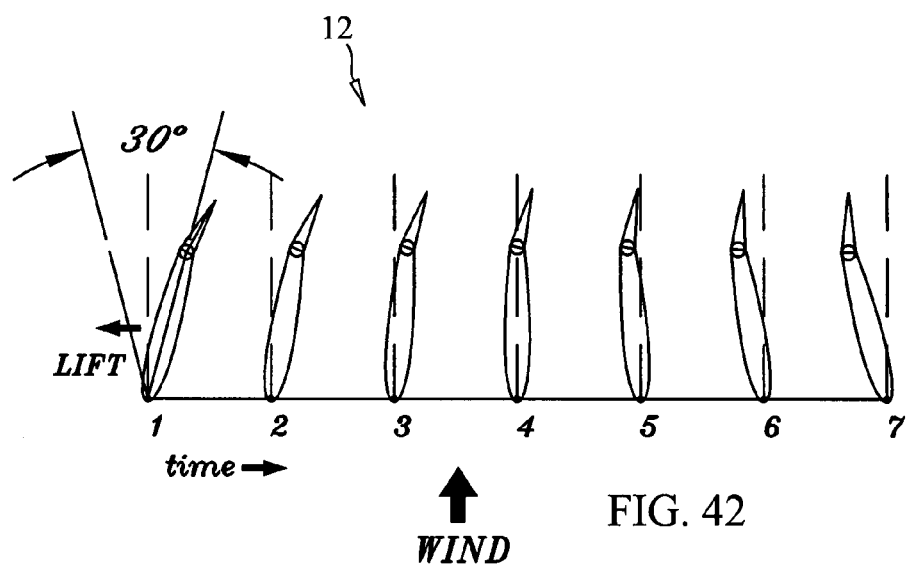
FIGS. 42-45 are plan views that illustrate the steps in the oscillation of a preferred two-element embodiment of the invention.
Figure 43:
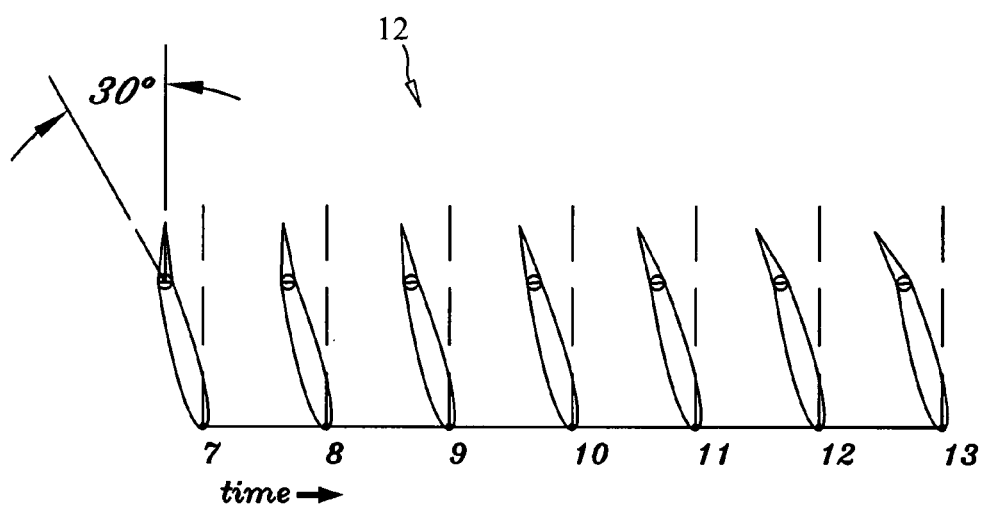
Figure 44:
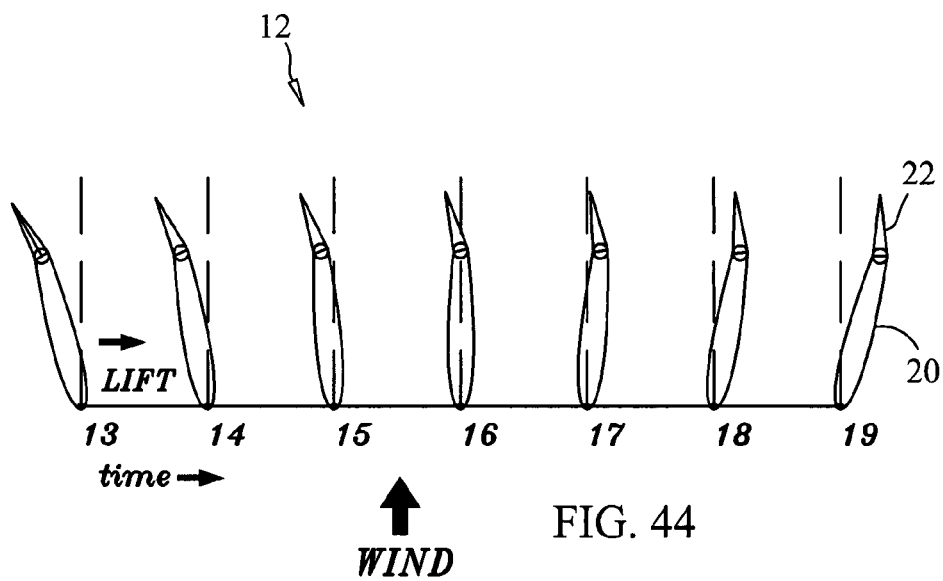
Figure 45:
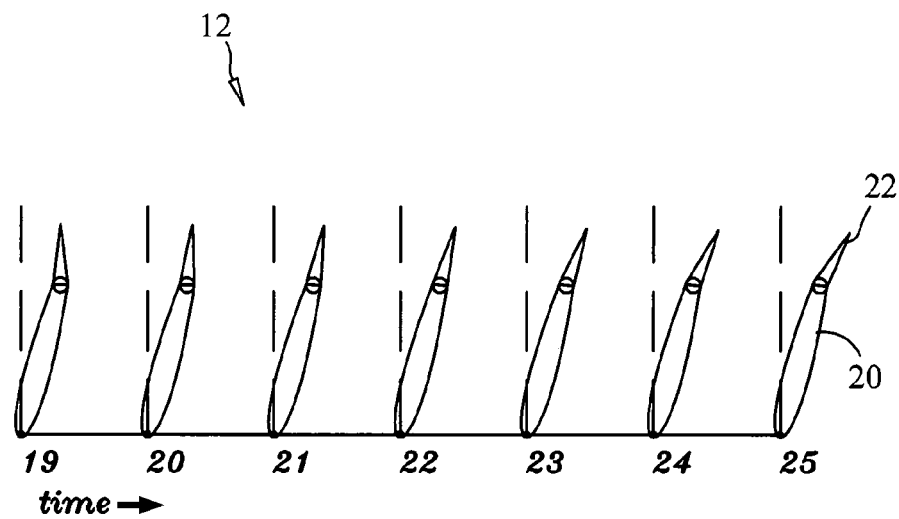
Figure 48:
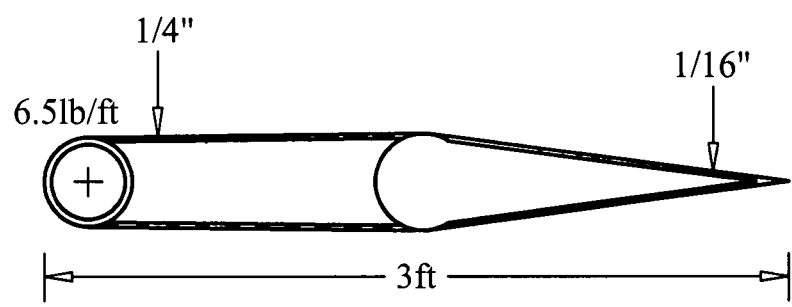
FIG. 48 is a plan view of the embodiment of FIGS. 46A and 46B that indicates dimensions of the theoretical system under study.
Figure 49:
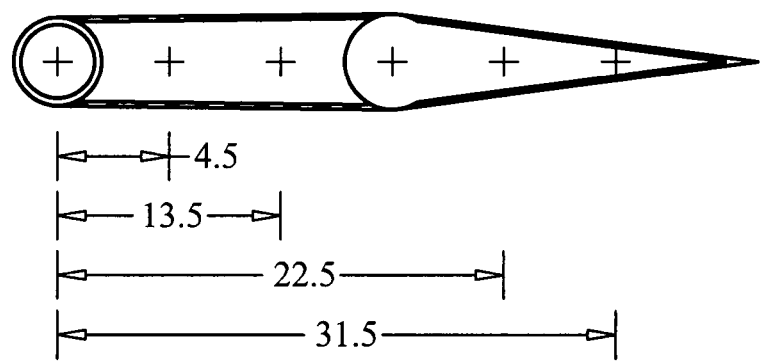
FIG. 49 is a plan view of the embodiment of FIGS. 46A and 46B that indicates weight distribution of the theoretical system under study.

Time sequence diagrams, FIGS. 42-45, illustrate the steps in the oscillation of a preferred embodiment of wing structure 12. In FIG. 42, body 20 and tail 22 rotate together to approximately 30 degrees from the wind direction due to lift generated by the wind. Power is extracted during this phase of movement. In FIG. 43, only tail 22 rotates left through about 30 degrees. In FIG. 44, body 20 and tail 22 rotate together over approximately 30 degrees due to lift generated by the wind. Power is extracted during this phase of movement. In FIG. 45, only tail 22 rotates to the right through approximately 30 degrees.

FIGS. 46-49 pertain to experiments involving a preferred embodiment of the wind power generator system 10. Theoretical calculations pertaining to power performance and cost-effectiveness of this preferred embodiment (e.g., the embodiment of FIG. 24B) are performed as follows:

For a rotating motion of the embodiment shown in FIGS. 46A and 46B:

| | | |
|---|---|---|
| Power, P = moment, M × ω | | [mkg/sec] |
| ω = angular velocity | | [1/sec] |
| Moment, M = F × r = (L cosα + D sinα) × r | | [mkg] |
| Lift, L = $c_L$ × A × r/2 g × $v^2$ | | [kg] |
| Drag, D = $c_D$ × A × r/2 g × $v^2$ | | [kg] |
| $c_L$, $c_D$ = lift coefficient, drag coefficient | | [--] |
| A = area of the fin | | [$m^2$] |
| v = wind velocity | | [m/sec] |
| ρ = air density | | [kg/$m^3$] |
| g = acceleration of gravity | | [m/$sec^2$] |
| Radius, r = distance of lift from rotation center | | [m] |

The integrated power over the entire angle of oscillation:

$$P = 2 \times \omega \int_{\alpha_{min}}^{\alpha_{max}} [L_{(\alpha)} \times \cos\alpha + D_{(\alpha)} \times \sin\alpha] \times r_{(\alpha)} d\alpha \quad [mkg/\sec]$$

In order to obtain the oscillating frequency of the wing, the oscillating frequency of a torsional pendulum is used:

$$\omega = \sqrt{M_{av}/J} \quad [1/\sec]$$

where M = the average torsional moment of the fin $$M = \int_{\alpha_{min}}^{\alpha_{max}} [L_{(\alpha)} \times \cos\alpha + D_{(\alpha)} \times \sin\alpha] \times r_{(\alpha)} d\alpha \quad [mkg] \text{ and}$$

$$J = \text{the moment of inertia, } J = \int y^2 dm \quad [mkg/\sec^2]$$

where y is the distance of the mass from the rotational center (the mast)

The frequency of a test model measuring 12 by 6 inches was tested and its frequency was measured at 105 beats per minute. The formula above was used to calculate this frequency and a cycle frequency, ω=9.64 [1/sec], which would yield a beat frequency of 92.1 beats per minute. This is an agreement of 88 percent, and helps to justify the theoretical deduction as a viable means of scaling up the measured values for a larger-scale model, especially because the theory is offset on the conservative side and would predict a lower power output than can reasonably be expected.

In order to obtain the power of a larger-size system, the lift and drag coefficients were calculated with VisualFoil (Hanley Innovations) software (cited above). In applying results from software modeling, the following procedure was used:

Observing the behavior of the test fin, an average lift coefficient was established between the angle of −30 to +30 degrees (see FIG. 47).

Because the drag coefficient is much smaller than the lift coefficient, and also contributes very little because it is multiplied with the sine of the angle, it was neglected. Thus the above equation reduces to the following form: P=2×Ω×$L_{av}$×cos α×r. Consistent with the lift coefficient software program, r was assumed at 40 percent of chord length. Further, since the cos α is close to one, an average angle of 15 degrees was assumed (cos α=0.96).

In order to make predictions from theory as to both power output and cost-effectiveness, two different models were designed. The first was a scale-model wind fin with a fin that would be 6 ft. high and 1 ft. wide, constructed with an aluminum skin 0.1 inch thick (0.1 lb/$in^3$).

| | |
|---|---|
| 1) Weight of fin W = 12 × 72 × 2 × 0.1 × 0.1 = 17.28 lb = 7.84 | [kg] |
| and the mass = W/g = 7.84/9.81 = 0.80 | [kg$sec^2$/m] |
| 2) Moment of inertia, J = 1/3 × m × $l^2$ | [mkg$sec^2$] |
| with l = 12 inch = 0.305[m] J = 0.247 | |
| 3) The moment on the fin M = c × q × A × r | |
| where c = $c_{av}$ = 1.65 q = ρ/2 g × $v^2$ = | |
| 4.89 [kg/sqm] @ 20 mph = 8.9 [m/sec] | |
| A = 6 sqft = 0.555 [sqm] and r = 0.4 × 1 = 4.8 inch = 0.122 [m] | |
| Thus the moment, $M_{av}$ = 0.546 [mkg] | |
| 4) The frequency | |
| ω = $\sqrt{M_{av}/J}$ = 4.7 [1/sec] or 44.9 beats per minute | |
| 5) The power P = 2 × ω × L × cosα × r = 2 × ω × M × cosα | |
| or P = 2 × 4.7 × .546 × .96 = 4.92 [mkg/sec] = 48.2 [Watts] | |

The second theoretical wind fin system designed for modeling consisted of a fiberglass fin measuring 20 ft. tall and 3 ft. wide. The mast for the system would be a six-inch diameter aluminum tube (schedule 40, OD=6.625", ID=6.065", t=0.280"). The fiberglass skin on the fin would be ¼ inch thick starting at the mast and diminishing to 1/16 inch at the trailing edge. The fin would have a foam core with 2 lb/$ft^3$ foam density (see FIG. 48).

To assess the frequency of this oscillating fin, a linear distribution of weight was assumed with the maximum weight at the mast, diminishing to zero at the trailing edge.

Total weight of the fin:
1) Skin: (¼+1/16)/2×36×12×0.072×2=9.72 [lb/ft]=4.41 [kg/ft]
2) Mast: 6" diameter Schedule 40 AL pipe 6.5 lb/ft
3) Foam Core: W=6×12/2×36×2/1728=1.5 lb/ft=0.68 kg To calculate the moment of inertia, the fin profile was divided into four sections with the following mass distribution. (See FIG. 49) The weight distribution, based upon a coarse estimate (only four portions), shifts the weight away from the mast (and accounts for the omitted weight of the hinge). This increases the moment of inertia, thus lowering the frequency and therefore leads to a conservative estimate of the power output.

Thus, the moment of inertia is calculated as follows:

| | |
|---|---|
| 1.74E−3 + 2.9E−3 + 18.8E−3 + 31.4E−3 + 20.5E3 | [m kg $sec^2$/ft] |
| Thus the total moment of inertia J = 75.3E−3 | [m kg $sec^2$/ft] |
| And the aerodynamic moment M = $c_L$ × q × A × r × cos = | [m kg/ft] |
| 1.65 × 4.89 × .278 × .365 × .96 = .786 | |
| Thus the fin frequency ω = $\sqrt{M/J}$ = 3.25 | |
| [1/sec] = 31.1 cycles/minute and the Power, P = | |
| 2 × ω × M × h = 2 × 3.25 × 0.786 = 5.11 [m kg/sec/ft] = 50.1 [Watts/ft] | |

Thus, with a 20 ft. tall wind fin system, power production would be 20×50.1=1,002 watts. The estimated year 2005 labor and materials cost related to the construction of a prototype 20 ft. by 3 ft. wind fin is $1,800, broken down as follows: labor, $600, materials: aluminum mast, $310; generator, $200; clutches, $150; tube, $160; foam, $150; resin, $80; cloth, $80; hinges, $50, bearings, $20. The applicant estimates that, in full production, a manufacturer could sell a wind fin of this size for $1,800. The profit would come from reduced labor and materials costs provided by economies of scale and discounts from large-volume wholesale purchase on the materials.

Preliminary wind-tunnel tests and computer modeling have shown that preferred embodiments of the disclosed technology are expected to be comparable if not superior in performance to current state-of-the-art wind turbines of comparable size—at approximately half the system cost. Theoretical calculations based on preferred embodiments predict that a wind fin measuring 20 feet tall by 3 feet wide on a thirty foot mast in a 20 mph wind would generate slightly over 1 kW of electricity. This is a significant improvement in performance over state-of-the-art wind turbines of comparable size.

Table 1 compares the estimated performance and cost of the wind fin to the performance and cost of state-of-the-art products from two leading small wind-turbine companies, Bergey Windpower and Southwest Windpower. It compares data pertaining to these companies' leading 1 kW products, Bergey's XL.1 Wind Turbine and Southwest Windpower's Whisper 200 Wind Turbine (formerly the H80), to the above-described 1 kW computer model of the wind fin.

TABLE 1

Performance and Cost Comparison of Wind Fin to Leading Commercial Wind Turbines

| Item | Bergey Windpower XL.1 Wind Turbine | Southwest Windpower Whisper 200 Turbine | Wind Fin |
|---|---|---|---|
| Size of system | 8.2-foot rotor diameter; 30-foot tilt-up tubular tower | 10-foot rotor diameter; 30-foot tilt-up tubular tower | 20-foot tall, 3-foot wide oscillating fin; 30-foot tall mast |
| Comparable power, at 20 mph (watts) | 425 | 800 | 1002 |
| Total system cost (uninstalled) | $3,400 | $3,315 | $1,800 |
| $/Watt at comparable power | $ 8.00 | $ 4.14 | $ 1.80 |

The results in Table 1 show that the wind fin is expected to compete very favorably in both performance and cost categories. Despite their 1 kW ratings, the Bergey Windpower XL.1 generates only 425 W at 20 mph and the Southwest Windpower Whisper 200 generates 800 W at 20 mph—according to their published power curves. The manufacturer's price (including tower) for the Bergey Windpower XL.1 is $3,400 and the manufacturer's price (with tower) for the Southwest Windpower Whisper 200 is $3,315, compared to the predicted manufacturer's price for a 1 kW wind fin of only $1,800. This means that the system cost per watt at a 20 mph rated speed would be $8.00 with the Bergey Windpower XL.1 and that with the Southwest Windpower Whisper 200 would be $4.14, compared to only $1.80 for the wind fin.

In conclusion, Table 1 suggests that the wind fin is likely to significantly outperform and be significantly more cost-effective than state-of-the-art wind turbines of comparable size from leading commercial manufacturers. This aspect, combined with the wind fin's lower purchase price, environmental advantages, and improved aesthetics, is expected to enable the wind fin to readily penetrate the marketplace.

Figure 50:
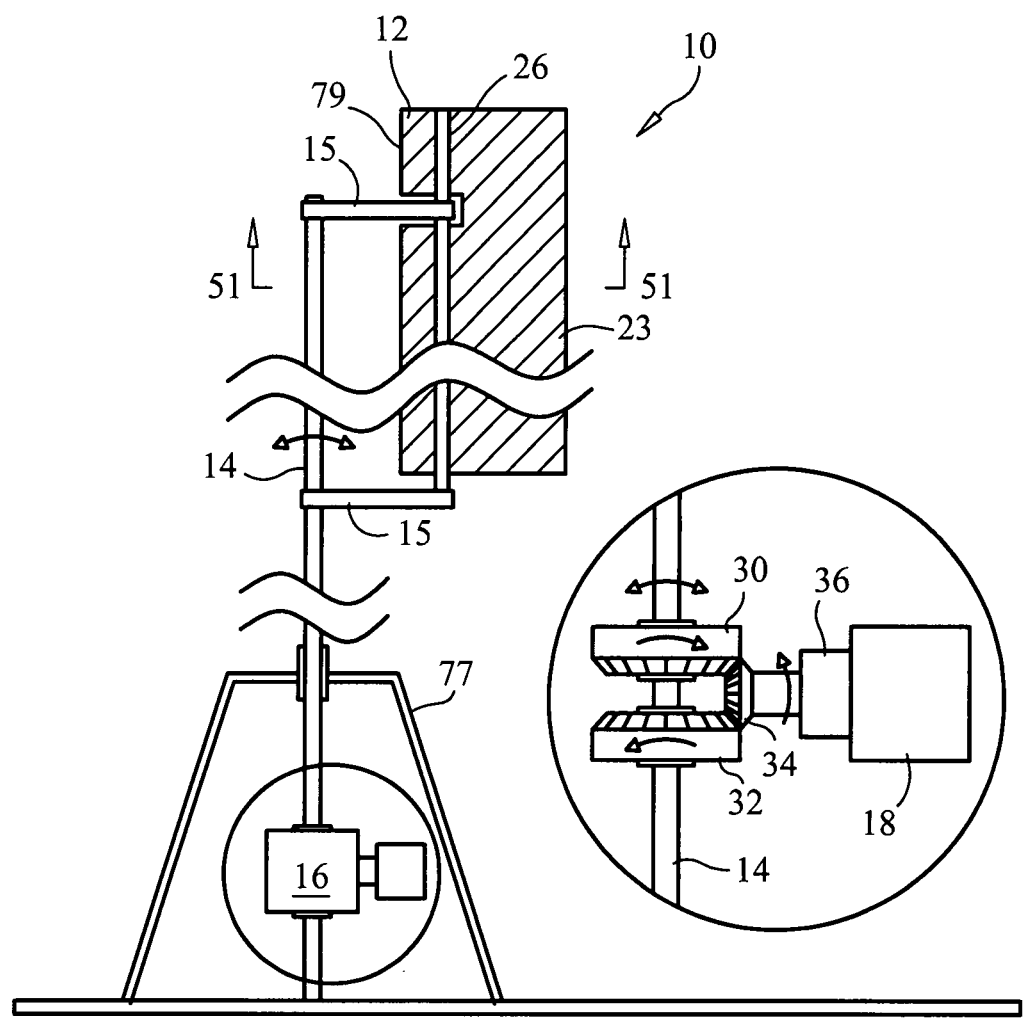
FIG. 50 is a schematic elevation view of another preferred embodiment of the invention.

Referring to FIG. 50, another preferred embodiment of system 10 is presented. In this embodiment, system 10 comprises wing structure 12, mast or oscillating drive shaft 14, power takeoff mechanism 16, generator 18, and tower structure 77. Preferably, said wing structure 12 comprises at least two stand-off arms or torque arms 15 and fin 23, with said stand-off arms or said torque arms 15 connecting hinge axis or spar 26 of fin 23 to said mast or oscillating drive shaft 14, without the use of a sleeve 13. Said mast or oscillating drive shaft 14 is supported by said tower structure 77. Said mast or oscillating drive shaft 14 oscillates back and forth when the wind or another fluid stream acts on said fin 23, driving said power takeoff mechanism 16.

Said power takeoff mechanism 16 preferably comprises two overrunning clutches (clockwise clutch 30 and counter-clockwise clutch 32), bevel gear 34 and gearbox 36, although any other mechanism for converting oscillating motion into rotary motion would suffice. Generator 20 preferably yaws with the wind direction. Stacked and opposing overrunning clutches 30 and 32 are driven by pinions (not shown) attached to said mast or oscillating drive shaft 14. These clutches in turn drive bevel gear 34. This in turn drives gearbox 36 and motor generator 18. Said power takeoff mechanism and generator are preferably housed at ground level inside tower housing 77, where they are easily accessible for maintenance.

Figure 51A:
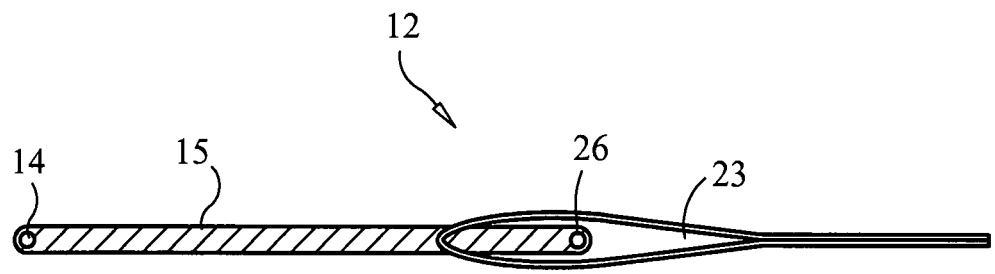
FIGS. 51A and 51B are schematic cross sectional views of the wing structure presented in FIG. 50.
Figure 51B:
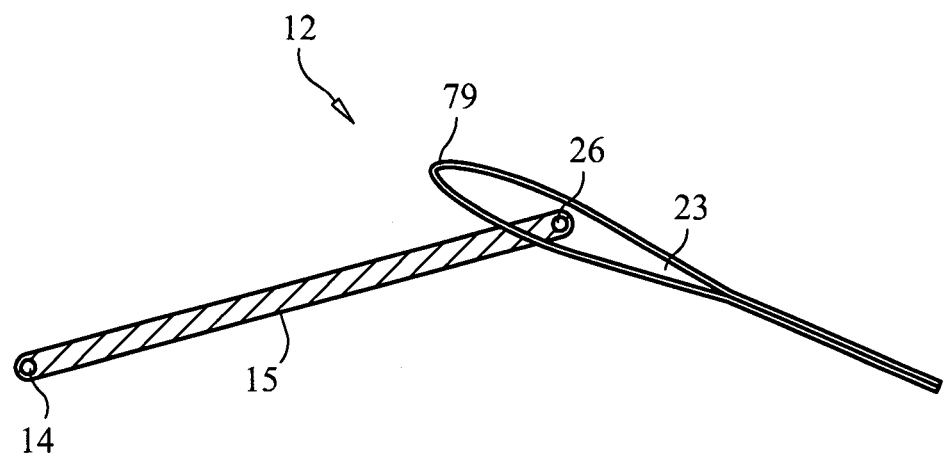
Figure 52:
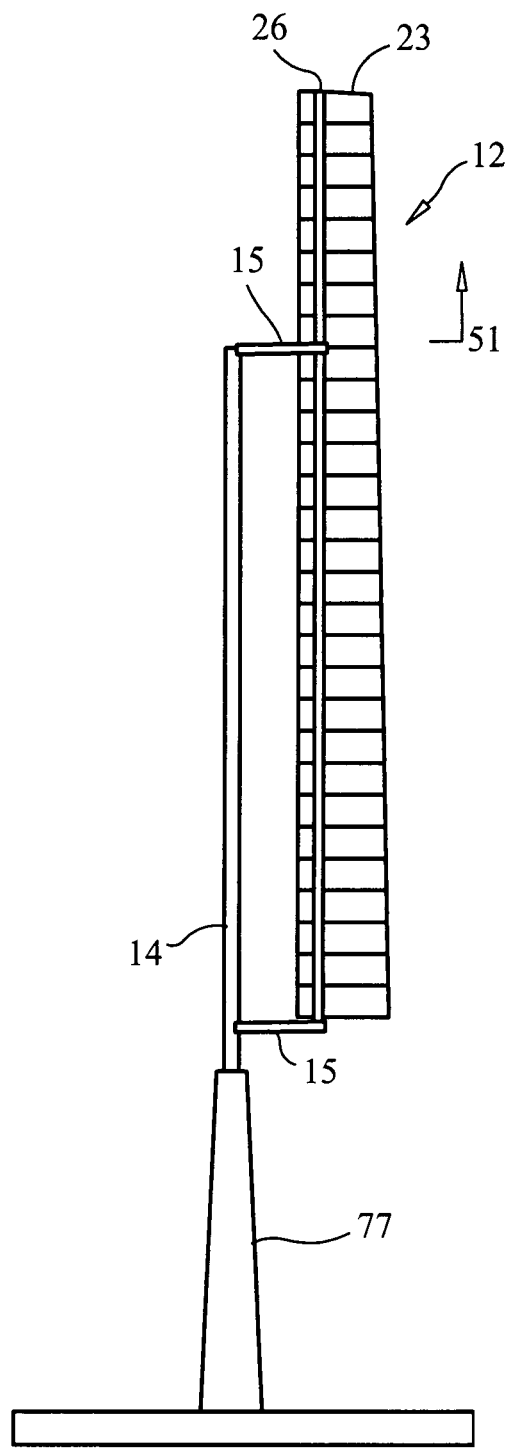
FIG. 52 is an elevation view of the preferred embodiment of the invention presented in FIG. 50.

Referring to FIG. 51A and FIG. 51B, cross sectional views of wing structure 12 in FIG. 50 are presented. Said stand-off arms or said torque arms 15 are shown fixed to said mast or oscillating drive shaft 14 and pivotably attached to said hinge axis or spar 26 of said fin 23.

Said hinge axis or spar 26 is preferably located at approximately 25 percent of the chord length of said fin 23 from leading edge 79 of said fin 23, although various alternative placements of said hinge axis or spar 26 are envisioned, from 5 percent to 45 percent of the chord length of said fin 23 from said leading edge 79 of said fin 23.

Said fin 23 preferably has a symmetrical aeronautical airfoil shape for its leading section that is preferably from 10 to 30 percent as wide as it is long, a concave middle section, and an elongated, thin, substantially straight trailing section. Preferably, said elongated, thin, substantially straight trailing section has a length that is from 25 to 150 percent of the chord length of said moderately thick, symmetrical aeronautical airfoil shape that comprises the leading section of fin 23.

In summary, preferred embodiments of the disclosed wind power generation technology have the following virtues: (1)

the wing structures do not oscillate so rapidly that ultra-high-strength materials are required or that these wing structures present a threat to birds or bats; (2) wing structures can be made of a wide range of relatively lightweight and inexpensive materials and also can be constructed in many different colors and patterns, enabling them to blend more readily than wind turbines into both built or natural environments; (3) forces are distributed along the length of the mast rather than being concentrated at the top of the structure, as is the case with horizontal-axis wind turbines; therefore, the structure does not need to be as complex and robustly constructed, reducing the overall system cost and increasing longevity; (4) the mast can either be free-standing for shorter systems, or guyed for taller systems; therefore, simple, relatively inexpensive, low-load bearing structures can be used with this new technology; (5) power extraction is at the ground level, below the main wing structure; this facilitates ready access to the generator for maintenance; (6) in order to avoid destruction during high winds, the wing structures can easily be locked using a simple, inexpensive device, allowing the system to feather or wind vane; alternatively, wing structure oscillation can be halted by moving a weight in the trailing edge of the wing structure toward the center of mass of the wing structure; (7) unlike Darrieus-type vertical-axis wind turbine systems (but like most horizontal-axis wind turbine systems), the wind fin is self-starting; and (8) the disclosed technology does not have the spacing problem of both horizontal-axis and vertical-axis wind turbines; wind fin systems can be installed in clusters, closely side-by-side, without diminishing their effectiveness.

Many variations of the invention will occur to those skilled in the art. All such variations are intended to be within the scope and spirit of the invention. Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. A method of harvesting energy from a moving, compressible fluid stream, said method comprising:
    producing a wing structure comprising a single airfoil element having a leading edge, a trailing edge to which no trim bias member is attached, and a cross-sectional shape that is operative to cause the aerodynamic lift of said single airfoil element when it is exposed to the moving, compressible fluid and a stand-off arm that is pivotably connected to said single airfoil element at a pivot that is spaced away from said leading edge;
    fixing said wing structure to a mast in a vertical orientation to produce a wind fin structure that is operative to yaw about said mast in response to a change in the direction of the moving, compressible fluid stream;
    exposing said wind fin structure to the moving, compressible fluid stream to produce mechanically-unassisted oscillation, thereby causing said mast to automatically pivot back and forth at an oscillating frequency;
    converting the back and forth movement into unidirectional rotation to produce motive power; and
    providing said motive power to an electricity generator.

2. An apparatus for extracting power from a moving fluid stream having a variable direction of movement, said apparatus comprising:
    a mast, said mast comprising: a rotatable drive shaft operable for bidirectional rotation supported by a lower tower structure;
    a wing structure, substantially vertical in orientation that is operative to yaw about said mast in response to a change in the direction of the moving fluid stream and having a vertical extent, a forward portion, an upper end and a lower end, configured to present airfoil surfaces to the moving fluid stream that generate lift first in one direction that is transverse the direction of movement of the moving fluid stream and then in another direction that is opposite said one direction during mechanically-unassisted oscillation of said wing structure in the moving fluid stream, said wing structure comprising: a single symmetrical airfoil having a leading edge and a hinge axis or spar that is spaced away from said leading edge and to which no trim biased member is attached, and at least two stand-off arms or torque arms, each of which stand-off arm or torque arm having two ends, a first end that is fixed to said rotatable drive shaft and a second end that is pivotably attached to a said hinge axis or spar; and
    a power take-off mechanism that is operative to convert the bidirectional rotation of said rotatable drive shaft to unidirectional rotation in order to provide motive power to an electricity generator.

3. The apparatus of claim 2 wherein said power take-off mechanism is selected from the group consisting of:
    a pair of overrunning clutches, a bevel gear that is connected to said pair of overrunning clutches, a gearbox that is connected to said bevel gear and an electricity generator that is connected to said gear box, wherein said overrunning clutches and said bevel gear, as a combination, are operative to convert the bidirectional rotation of the said rotatable drive shaft or said rotatable sleeve into unidirectional rotation in order to provide motive power to said gearbox and said electricity generator; and
    a crank arm that is connected to the forward portion of said wing structure, wherein the oscillating movement of said wing structure is converted into longitudinal back and forth movement of said crank arm, that drives an electricity generator.

4. The apparatus of claim 2 wherein said single symmetrical airfoil is selected from the group consisting of:
    a ribbed airfoil comprising symmetrical wing ribs and a skin made of fiber-reinforced plastic, an aircraft fabric covering, aluminum, or ripstop nylon that conforms to said symmetrical wing ribs;
    a foam core airfoil comprising a molded foam core and a skin made of fiber-reinforced plastic, an aircraft fabric covering, aluminum, or ripstop nylon that conforms to said molded foam core;
    a framed sheet airfoil; and
    a self-inflating airfoil.

5. An apparatus for extracting power from a moving fluid stream, said moving stream having a direction of movement over ground, said apparatus comprising:
    a mast comprising: a rotatable drive shaft operable for bidirectional rotation supported by a tower structure;
    a wing structure comprising: at least one stand-off arm or torque arm, said stand-off arm or torque arm having two ends, a first end that is fixed to said rotatable drive shaft and a second end that is pivotably attached to a hinge axis or spar, and a single airfoil that is attached to each said hinge axis or spar, said single airfoil having no trim bias member attached thereto; and
    a power take-off mechanism that is operative to convert bidirectional rotation to unidirectional rotation;
    wherein said single airfoil is configured to present airfoil surfaces to the moving fluid stream that generate lift first in one direction that is transverse the direction of movement of the moving stream and then in another direction that is opposite said one direction during an oscillation of said single airfoil in the moving fluid stream, which oscillation is mechanically unassisted and is operative to cause said rotatable drive shaft to pivot back and forth; and wherein said pivoting movement is converted by said power take-off mechanism to rotational movement in order to provide motive power to an electricity generator.

6. The apparatus of claim 5, wherein said power take-off mechanism is located at ground level and is selected from the group consisting of:
a pair of overrunning clutches, a bevel gear that is connected to said pair of overrunning clutches, a gearbox that is connected to said bevel gear and an electricity generator that is connected to said gear box, wherein said overrunning clutches and said bevel gear, as a combination, are operative to convert the bidirectional rotation of said rotatable drive shaft or said rotatable sleeve into unidirectional rotation in order to provide motive power to said gearbox and said electricity generator; and
a crank arm that is connected to the forward portion of said wing structure, wherein the oscillating movement of said wing structure is converted into longitudinal back and forth movement of said crank arm, driving an electricity generator.

7. The apparatus of claim 5 wherein said single airfoil is selected from the group consisting of:
a ribbed airfoil, comprising symmetrical wing ribs and a skin made of fiber-reinforced plastic, an aircraft fabric covering, aluminum, or ripstop nylon that conforms to said symmetrical wing ribs;
a foam core airfoil, comprising a molded foam core and a skin made of fiber-reinforced plastic, an aircraft fabric covering, aluminum, or ripstop nylon that conforms to said molded foam core;
a framed sheet airfoil; and
a self-inflating airfoil.

8. An apparatus for extracting power from a moving fluid stream, said apparatus comprising:
a mast;
a wing structure comprising a combination having one or more horizontally oriented arms that are yawably attached to said mast and a single vertically oriented untrimmed airfoil, said vertically oriented airfoil having a leading edge and a hinge axis or spar that is disposed away from said leading edge and to which said one or more horizontally oriented arms are pivotably attached; and
a power take-off mechanism that is driven either directly by a pivoting movement of said mast and said wing structure or by a pivoting movement of said wing structure with said mast remaining stationary;
wherein said wing structure is configured to present airfoil surfaces to the moving fluid stream that generate lift first in one direction that is transverse the direction of movement of the moving fluid stream and then in another direction that is opposite said one direction during an mechanically-unassisted oscillation of said wing structure in the moving fluid stream;
thereby maximizing the aerodynamic lift of said combination in the moving fluid stream, which in turn maximizes the conversion of the energy of the moving fluid stream into useful power.

9. An apparatus for extracting power from a moving fluid stream that is moving above a ground level, said apparatus comprising:
a stationary support tower;
a rotatable drive shaft operable for bidirectional rotation that is supported by said stationary support tower;
a wing structure comprising at least two stand-off arms or torque arms, each of which stand-off arm or torque arm having two ends, a first end that is fixed to said drive shaft and a second end that is pivotably attached to a hinge axis or spar, and a single symmetrical untrimmed airfoil that is attached to each said hinge axis or spar, said single symmetrical untrimmed airfoil having a leading edge, symmetrically curved sides and a chord length;
a power take-off mechanism that is operative to convert bidirectional rotation to unidirectional rotation;
wherein said wing structure is configured to oscillate back and forth in the moving fluid stream in a self-sustaining manner that requires no mechanical assist, which oscillation is operative to cause said rotatable drive shaft to pivot back and forth; and
wherein said pivoting movement of said rotatable drive shaft is converted by said power take-off mechanism to unidirectional rotational movement in order to provide motive power to an electricity generator.

10. The apparatus of claim 9 wherein said hinge axis or spar is located between 5 percent and 45 percent of the chord length of said single symmetrical airfoil as measured from said leading edge of said single symmetrical untrimmed airfoil.

11. The apparatus of claim 9 wherein said wing structure further comprises a single symmetrical untrimmed airfoil having a maximum thickness and a chord length and comprising a forward section that has a symmetrical aeronautical airfoil shape that is preferably from 10 to 30 percent as wide as it is long, said forward section being followed by an elongated, thin, substantially straight trailing section that is an integral extension of said symmetrical aeronautical airfoil shape, said elongated, thin, substantially straight trailing section preferably having a length that is from 25 to 150 percent of the chord length of said symmetrical aeronautical airfoil shape, the two sections forming a concavity where they merge together.

12. The apparatus of claim 11 wherein the maximum thickness of said single symmetrical untrimmed airfoil occurs between 10 percent and 35 percent of the chord length of said single symmetrical airfoil as measured from said leading edge of said single symmetrical airfoil.

13. The apparatus of claim 9 wherein said power take-off mechanism is located at the ground level and is selected from the group consisting of
a pair of overrunning clutches, a bevel gear that is connected to said pair of overrunning clutches, a gearbox that is connected to said bevel gear and an electricity generator that is connected to said gear box, wherein said overrunning clutches and said bevel gear, as a combination, are operative to convert the bidirectional rotation of the said rotatable drive shaft or said rotatable sleeve into unidirectional rotation in order to provide motive power to said gearbox and said electricity generator, and
a crank arm that is connected to at least one of the stand-off arms of said wing structure, wherein the oscillating movement of said wing structure is converted into longitudinal back and forth movement of said crank arm, which drives an electricity generator.

14. The apparatus of claim 9 wherein said single symmetrical untrimmed airfoil is selected from the group consisting of:
- a ribbed airfoil comprising symmetrical wind ribs and a skin made of fiber-reinforced plastic, an aircraft fabric covering, aluminum, or ripstop nylon that conforms to said symmetrical wing ribs;
- a foam core airfoil comprising a molded foam core and a skin made of fiber-reinforced plastic, an aircraft fabric covering, aluminum, or ripstop nylon that conforms to said molded foam core;
- a framed sheet airfoil; and
- a self-inflating airfoil.

15. A method of generating power comprising:
- placing the apparatus of claim 2, 5 or 9 in a location that experiences a sustained wind;
- self starting the oscillating of said wing structure by said sustained wind, thereby causing said rotatable drive shaft or said rotatable sleeve to move back and forth;
- converting the back and forth movement into unidirectional rotation to produce motive power; and
- providing said motive power to an electricity generator.

16. A method of generating power comprising:
- a step for placing the apparatus of claim 2, 5 or 9 in a location that experiences a sustained wind;
- a step for self starting the oscillating of said wing structure by said sustained wind, thereby causing said rotatable drive shaft or said rotatable sleeve to move back and forth;
- a step for converting the back and forth movement into unidirectional rotation to produce motive power; and
- a step for providing said motive power to an electricity generator.

\* \* \* \* \*